United States Patent
Wellmann

(10) Patent No.: US 9,279,692 B2
(45) Date of Patent: Mar. 8, 2016

(54) OPTIMUM ROUTE DETERMINATION WITH TILING

(75) Inventor: Harald Wellmann, Hamburg (DE)

(73) Assignee: HARMAN BECKER AUTOMOTIVE SERVICES GMBH, Karlsbad (DE)

( * ) Notice: Subject to any disclaimer, the term of this patent is extended or adjusted under 35 U.S.C. 154(b) by 405 days.

(21) Appl. No.: 13/152,145

(22) Filed: Jun. 2, 2011

(65) Prior Publication Data

US 2011/0301837 A1  Dec. 8, 2011

Related U.S. Application Data

(62) Division of application No. 11/595,802, filed on Nov. 9, 2006, now Pat. No. 7,957,894.

(30) Foreign Application Priority Data

Nov. 9, 2005  (EP) .................................... 05024414

(51) Int. Cl.
*G01C 21/34* (2006.01)
*G08G 1/0968* (2006.01)

(52) U.S. Cl.
CPC .......... *G01C 21/3446* (2013.01); *G08G 1/0968* (2013.01); *G08G 1/09685* (2013.01); *G08G 1/096827* (2013.01)

(58) Field of Classification Search
CPC ............. G01C 21/3446; G08G 1/0968; G08G 1/09685; G08G 1/096827
USPC .................................................. 701/400, 409
See application file for complete search history.

(56) References Cited

U.S. PATENT DOCUMENTS

| | | | | |
|---|---|---|---|---|
| 4,796,189 A | * | 1/1989 | Nakayama et al. | 701/430 |
| 4,972,319 A | * | 11/1990 | Delorme | 340/990 |
| 4,984,168 A | | 1/1991 | Neukrichner et al. | |
| 5,168,452 A | * | 12/1992 | Yamada et al. | 701/533 |
| 5,968,109 A | * | 10/1999 | Israni et al. | 701/532 |
| 6,016,485 A | | 1/2000 | Amakawa et al. | |
| 6,112,200 A | * | 8/2000 | Livshutz et al. | 707/803 |
| 6,167,332 A | * | 12/2000 | Kurtzberg et al. | 701/23 |
| 6,308,177 B1 | * | 10/2001 | Israni et al. | 701/461 |
| 6,507,850 B1 | * | 1/2003 | Livshutz et al. | 701/532 |
| 6,529,821 B2 | * | 3/2003 | Tomasi et al. | 701/467 |
| 6,665,852 B2 | | 12/2003 | Xing et al. | |
| 6,772,142 B1 | * | 8/2004 | Kelling et al. | 707/724 |
| 6,782,319 B1 | * | 8/2004 | McDonough | 701/532 |

(Continued)

FOREIGN PATENT DOCUMENTS

| | | |
|---|---|---|
| EP | 0 323 485 B1 | 8/1992 |
| EP | 1 473 543 A2 | 11/2004 |
| WO | WO 03/079155 A1 | 9/2003 |

*Primary Examiner* — Nicholas Kiswanto

(74) *Attorney, Agent, or Firm* — Artegis Law Group, LLP

(57) ABSTRACT

An optimum route search may be conducted through the use of a tiling overlay on the network of road segments. Overlaying the tiling (grid) over the road segments allows for a reduction of the number of road segments considered for an optimum path as road segments can be evaluated on whether the road segment is part of an optimal path to the borders of a first tile and then successively larger frames of tiles around the initial tile. By reducing the number of road segments considered for the optimum route search to road segments that are part of optimal routes to various tile boundary edges, the computation of the optimum route for the route of interest may be quicker and less resource intensive than efforts to determine optimum routes through other methods.

10 Claims, 15 Drawing Sheets

(56) References Cited

U.S. PATENT DOCUMENTS

| | | | |
|---|---|---|---|
| 6,928,364 B2* | 8/2005 | Tsuyuki | 701/410 |
| 6,937,936 B2* | 8/2005 | Nimura | 701/421 |
| 6,954,153 B2* | 10/2005 | Choi | 340/995.12 |
| 7,058,504 B2* | 6/2006 | McDonough | 701/532 |
| 7,062,377 B2* | 6/2006 | McDonough | 701/532 |
| 7,114,050 B2* | 9/2006 | Ashby | 711/170 |
| 7,197,500 B1* | 3/2007 | Israni et al. | 707/809 |
| 7,957,894 B2 | 6/2011 | Wellmann | |
| 8,160,814 B2* | 4/2012 | Nakamura et al. | 701/409 |
| 2002/0016670 A1* | 2/2002 | Powell et al. | 701/209 |
| 2002/0128771 A1* | 9/2002 | Nagaki | 701/208 |
| 2005/0102097 A1* | 5/2005 | Tanizaki et al. | 701/208 |
| 2006/0058950 A1* | 3/2006 | Kato et al. | 701/208 |
| 2008/0201070 A1* | 8/2008 | Kikuchi | 701/209 |

* cited by examiner

FIG. 15

| S | G(1) | G(2) | G(3) | G(4) |
|---|---|---|---|---|
| G(1) | G(1) | G(2) | G(3) | G(3) |
| G(2) | G(2) | G(2) | G(2) | G(2) |
| G(3) | G(3) | G(2) | G(1) | G(1) |
| G(4) | G(3) | G(2) | G(1) | D |

FIG. 16

| S | G(1) | G(2) | G(3) | G(3) |
|---|---|---|---|---|
| G(1) | G(1) | G(2) | G(3) | G(3) |
| G(2) | G(2) | G(2) | G(2) | G(2) |
| G(3) | G(3) | G(2) | G(1) | G(1) |
| G(3) | G(3) | G(2) | G(1) | D |

OPTIMUM ROUTE DETERMINATION WITH TILING

CROSS-REFERENCE TO RELATED APPLICATION

This application is a divisional of U.S. patent application Ser. No. 11/595,802, filed Nov. 9, 2006, titled OPTIMUM ROUTE DETERMINATION WITH TILING, that claims priority to European Application No. EP 05 024 414.4 filed Nov. 9, 2005, both application of which are incorporated by reference in this application in their entirety.

BACKGROUND OF THE INVENTION

1. Field of the Invention

This invention relates generally to optimum route determination. In particular, this invention relates to a method and corresponding system for pre-processing road segment data, a method and corresponding system for determining an optimum route based on pre-processed road segment data, and a navigation system.

2. Related Art

Finding an optimum route from a given start point to a given destination point is one of the key functions of car navigation systems or other systems providing optimum route information.

While several algorithms are known for solving the problem of finding an optimum route, it is often not feasible to apply these algorithms directly to a road network such as found in a European country or the United States because of the large number of road segments and road segment vertices in these road networks. The number of vertices may well be of the order or in excess of one million. Because of memory and runtime restrictions in a car navigation system, it is therefore not feasible to directly employ standard shortest path algorithms to a long-distance optimum route search.

When road networks have a natural hierarchical structure expressed by road classes, such as "Autobahn", "Bundesstraße", and "Kreisstraße" in Germany, or "Motorway", "A road", and "B road" in the UK, these road classes may be used to reduce the complexity of optimum route search. The determination of an optimum route may be broken down into several subtasks, namely: A) the tasks of finding a short-distance route from the start point to an opportunity for high speed travel such as a motorway junction or a junction of another road allowing fast long-distance travel; B) finding a short-distance route from the destination to another motorway junction or a junction of another road allowing fast long-distance travel; and C) the task of finding an optimum route between these two motorway junctions using motorways or other roads allowing fast long-distance travel only.

A hierarchical structure of the road network is also reflected by maps having the standardized GDF (Geographic Data File) format, in which all road segments have an attribute called Functional Road Class (FRC) which defines a hierarchy of roads and is intended to distinguish roads of local importance from those of national or international importance.

However, it should be noted that, because the hierarchical structure of road segments is assigned by a human expert, the determined route may not be truly optimum. Furthermore, it may not be sufficient to rely on standard road hierarchies such as the FRC that target fastest routes and, therefore, may be inappropriate for computing shortest routes or other routing options. Values quantifying road importance that are assigned by human experts may therefore be insufficient. Thus, it would be useful to augment the prior art with a method for determining a road segment attribute from map geometry. In particular, there is remains a need for a method for determining optimum routes in which such road segment attributes may be determined efficiently, even for large road networks.

SUMMARY

An optimum route search may be conducted through the use of a tiling overlay on the network of road segments. Overlaying the tiling (grid) over the road segments allows for a reduction of the number of road segments considered for an optimum path as road segments can be evaluated on whether the road segment is part of an optimal path to the borders of a first tile and then successively larger frames of tiles around the initial tile. By reducing the number of road segments considered for the optimum route search to road segments that are part of optimal routes to various tile boundary edges, the computation of the optimum route for the route of interest may be quicker and less resource intensive than through other methods.

The general concept of using tiling in methods for determining optimum routes may be implemented in a variety of ways, each way having some ability to make efficient use of computational resources so that navigation systems with finite resources including onboard navigation systems used in vehicles may handle road networks with many road segments. Methods that use tiling may be adapted for use with computer clusters, computer grids, or other arrangements to partition the task and have multiple computers involved in obtaining a solution.

Optimum may be defined in a number of ways and the attributes of road segments with respect to various definitions of optimum may be stored so that an end user may choose among several choices for the type of optimum route to be determined through the use of tiling.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood with reference to the following figures. The components in the figures are not necessarily to scale, emphasis instead being placed upon illustrating the principles of the invention. Moreover, in the figures, like reference numerals designate corresponding elements throughout the different views. Additional features and advantages of the present invention will become more readily appreciated from the following detailed description of preferred or advantageous embodiments with reference to the accompanying drawings, wherein:

FIG. 15 is a view of tiling 510 with start tile S and destination tile D arranged in opposite corners of the tiling and showing the minimum rank values of interest for road segments located in the various tiles for a route from tile S to tile D;

FIG. 16 is a view of tiling 520 which differs from FIG. 15 in that calculations of rank value are capped at 3;

DETAILED DESCRIPTION

Figure 1:
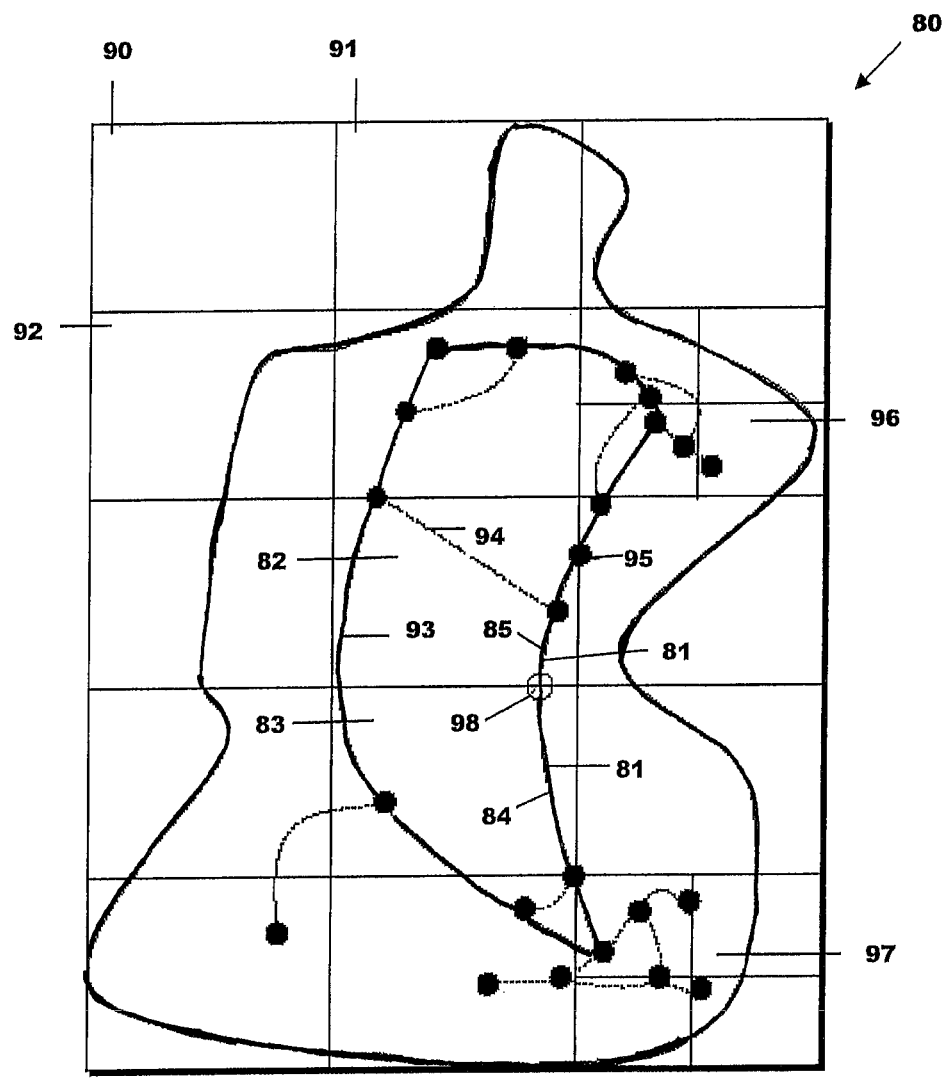
FIG. 1 is a set of tiles 80 overlaid on a road network for which an optimum route is to be computed.

FIG. 1 introduces the concept of tiling through a set of tiles 80 including tiles 90, 91, and 92. The set of tiles 80 is overlaid on a road network for which an optimum route is to be computed. The roads in the road network include roads of different types. The road may be categorized or typed in terms of allowed travel speeds that may be quantified by weighting factors. While a road network may have many different categories of road in the network, for sake of simplicity, the road network shown in FIG. 1 has only two types of roads: one with a first characteristic travel speed such as road segment 93 (and other road segments indicated by solid lines in FIG. 1); and a second with a second characteristic travel speed such as road segment 94 (and the other road segments indicated by dashed lines in FIG. 1). The endpoints of a road segment or road segment junctions or crossings define vertices indicated in FIG. 1 by solid circles such as vertex 95.

The density of roads and intersections of roads varies across the country and generally the density of roads and intersections of roads will be highest in urban areas and lowest in rural or wilderness areas. A designer implementing the teachings of the present disclosure may choose to reduce the tile size in urban areas with high densities of road segments and vertices ("items") in order to reduce the dynamic range of item density between the most dense and the least dense. Thus, a tile may be subdivided to create smaller tiles in an area with high item density. This concept is illustrated by small tiles 96 and 97 in FIG. 1. Many other implementations will start with uniform tile sizes.

For road segment data pre-processing (discussed below) the tiling may be set up such that each road segment is contained in just one tile of the tiling. Thus, this road segment may be exclusively in tile 90, 91, or 92. One way to achieve this objective is to add vertices at each point where a road segment crosses a tile edge or a tile corner. For example, road segment 81 crosses from tile 82 to tile 83. The addition of vertex 98 at the boundary between tiles 82 and 83 breaks the original road segment 81 into segments 84 and 85. The combination of tile edges and tile corners may be referenced as tile border or a perimeter. The combination of the edges for a set of tiles and the corners or vertices for the set of tiles may be called a border or a perimeter.

The definition of road segments so that each road segment may be contained within one tile may be performed as part of pre-processing the road segments to prepare for further processing as described below.

Figures 2, 3:
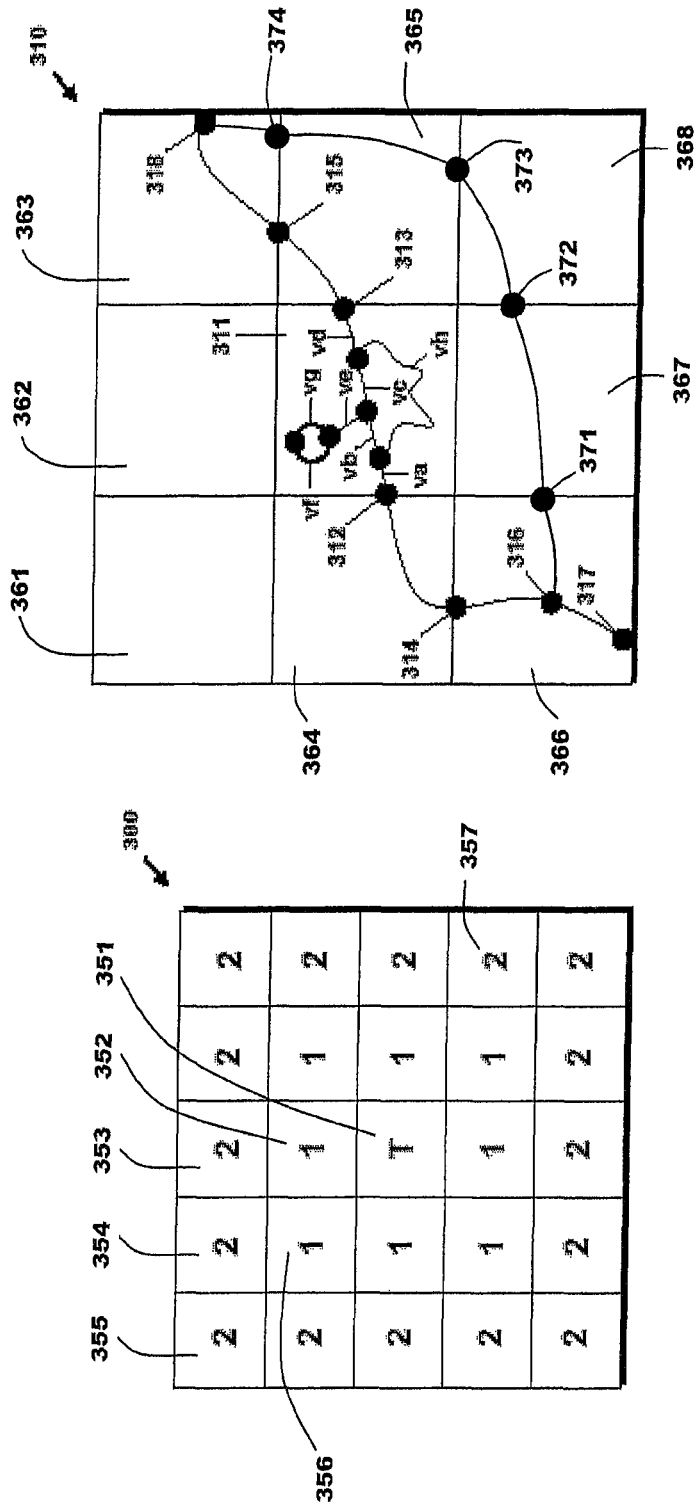
FIG. 2 is a tiling 300 with the tiles indicating a tile distance from tile T.
FIG. 3 is a representation of a road network and tiling 310.

FIG. 2 illustrates the concept of tile distance for tiling 300. While the concept of tile distance could be defined in another way, one useful way of defining tile distance is the number of tile perimeters (sides or corners) that must be crossed to get from one tile to another. Thus by crossing only one tile perimeter, one could go from tile T to any of the eight tiles surrounding tile T. These tiles are given a tile distance of 1. By crossing one more tile perimeter, 16 additional tiles could be reached. These tiles are marked with a tile distance of 2. Note, that the tile distance is the minimum number of tile perimeters that must be traversed. So while one could go from tile 351 to tile 355 through tiles 352, 353, and 354; tile 355 had a tile distance of 2 relative to tile 351 (T) as one may go through the corner of tile 351 into tile 356 and through the corner of tile 356 into tile 355 (two moves).

The teachings of the present disclosure may be implemented through use of a rank value for a road segment. One definition of rank value of a road segment is a maximum number of tiles for an optimum path containing this road segment in the middle tile of the set of tiles. To put this another way, for a given optimum path, take the minimum of (tile distance of the tile containing the road segment at the start of the optimal path) and (tile distance of the tile containing the road segment at the end of the optimal path). Thus if the start segment is in the same tile 351 as the road segment to be ranked and the stop segment is two tiles away (in tile 353), the rank for that road segment is zero for that path. If the start road segment for an optimal path between a start road segment two tiles away (in tile 357) from the road segment to be ranked (in tile 351) and the stop road segment is two tiles away (in tile 355) from the road segment to be ranked in tile 351 then the rank for the road segment in tile 351 is 2. As described in detail below, the system may use a rank information value which may simply be the rank value or may be based upon the rank value.

FIG. 3 is a schematic illustration of a road network and tiling 310. Although an actual tiling may have many more road segments, the added clutter from adding additional road segments to this figure would not assist in conveying the important points. Assuming that the rank value of a particular road segment va is to be determined, the first step is to determine whether there is an optimum route connecting a start road segment and a destination road segment, each having a tile distance of 1 from tile 311 that contains the road segment va. Put in another way, is road segment va part of an optimum route between any road segment in tiles 361-368 and another road segment in tiles 361-368? If road segment va was near an edge of a tile, for example tile 362, it is possible that road segment va could be part of an optimal path between a road segment in one part of tile 362 and another road segment in tile 362.

Assuming that all possible road segments are shown in tiling 310, one might compute all possible optimum routes connecting the various vertices 312-318. This is not necessary as any optimum route involving tile 311 having a start road segment in a tile outside of tile 311 and a final road segment outside of tile 311 must cross into tile 311. Because road segments have been defined so that one road segment does not exist in two tiles, it is sufficient to compute all optimal routes connecting a start point and an end point, each located on an edge of tile 311.

While FIG. 3 is a simplification of an actual road network, even from this simplified figure, one may discern the significant reduction in effort from having 132 possible combination of 12 vertices. The number 132 comes from 12 possible start points and 12 possible destinations which would be 144 routes and removing the 12 instances where the start point is the same as the destination. Leaving in pairs such as 317 to 316 and 316 to 317 is not necessarily redundant as the travel times may differ in one direction versus another. After the simplification, there are only two combinations (312 to 313 and 313 to 312). An implementation that assumes equal travel times in both directions would have only one pair.

This same method may be applied to larger tile distances. Comparing FIG. 3 with FIG. 2, one may see that tiles 361-368 form a frame around tile 311 where tiles 361-368 all have a tile distance of 1. While not shown in FIG. 3, tiling 310 maybe part of a larger tiling with a frame around tiling 310 having 16 tiles with tile distance of 2. When looking to see if va is part of an optimum route from a start point with tile distance 2 from tile 311 and an end point of tile distance 2 from tile 311, it is sufficient to see if va is part of an optimal path on the outer perimeter of a frame of tiles having a tile distance of ((tile distance of interest)−1). In this case (2−1) or 1. Thus it is sufficient to see whether va is part of an optimal route between vertices 317 and 318 as these are the only two vertices on the outer perimeter of the set of tiles with a tile distance of 1 from road segment va.

Looking now at FIG. 2, for a tile distance of 3, one would look at optimal paths running from two vertices on the perimeter of the set of tiles having a tile distance of 2 which is the outer perimeter of tiling 300 as tiling 300 would be surrounded by a frame of 24 tiles (not shown) with a tile distance of 3. A nomenclature that may be utilized is B(d,T) to indicate the boundary ("B") for a distance ("d") from the tile of the road segment of interest ("T"). Thus for FIG. 2, the B(1,T) is the outer perimeter of tile T, the B(2,T) is the outer border of the 8 tiles with tile distance 1, and B(3,T) is the outer border of the 16 tiles with tile distance of 2.

Figure 4:
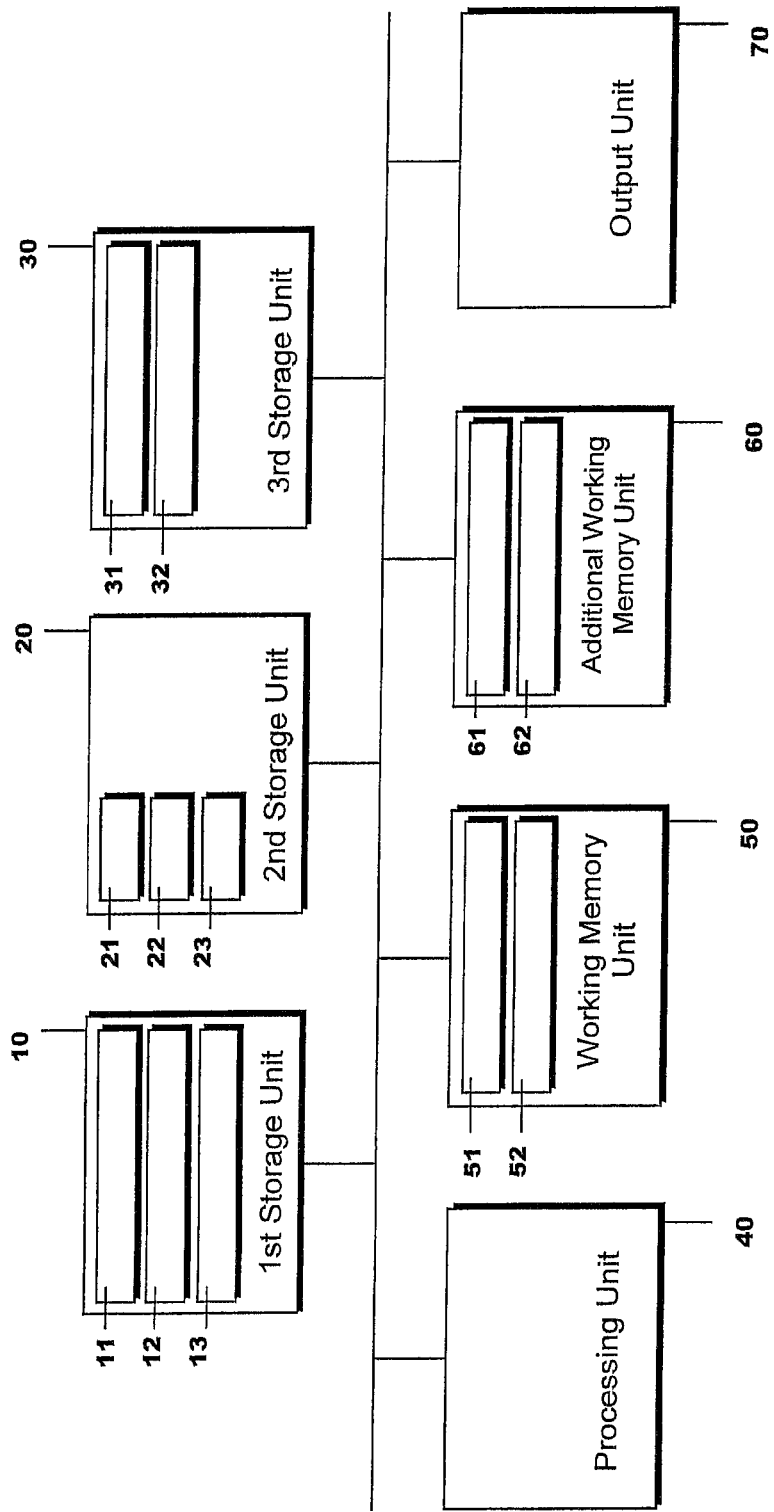
FIG. 4 is a block diagram of a system 1 for pre-processing road segment data.
Figure 5:
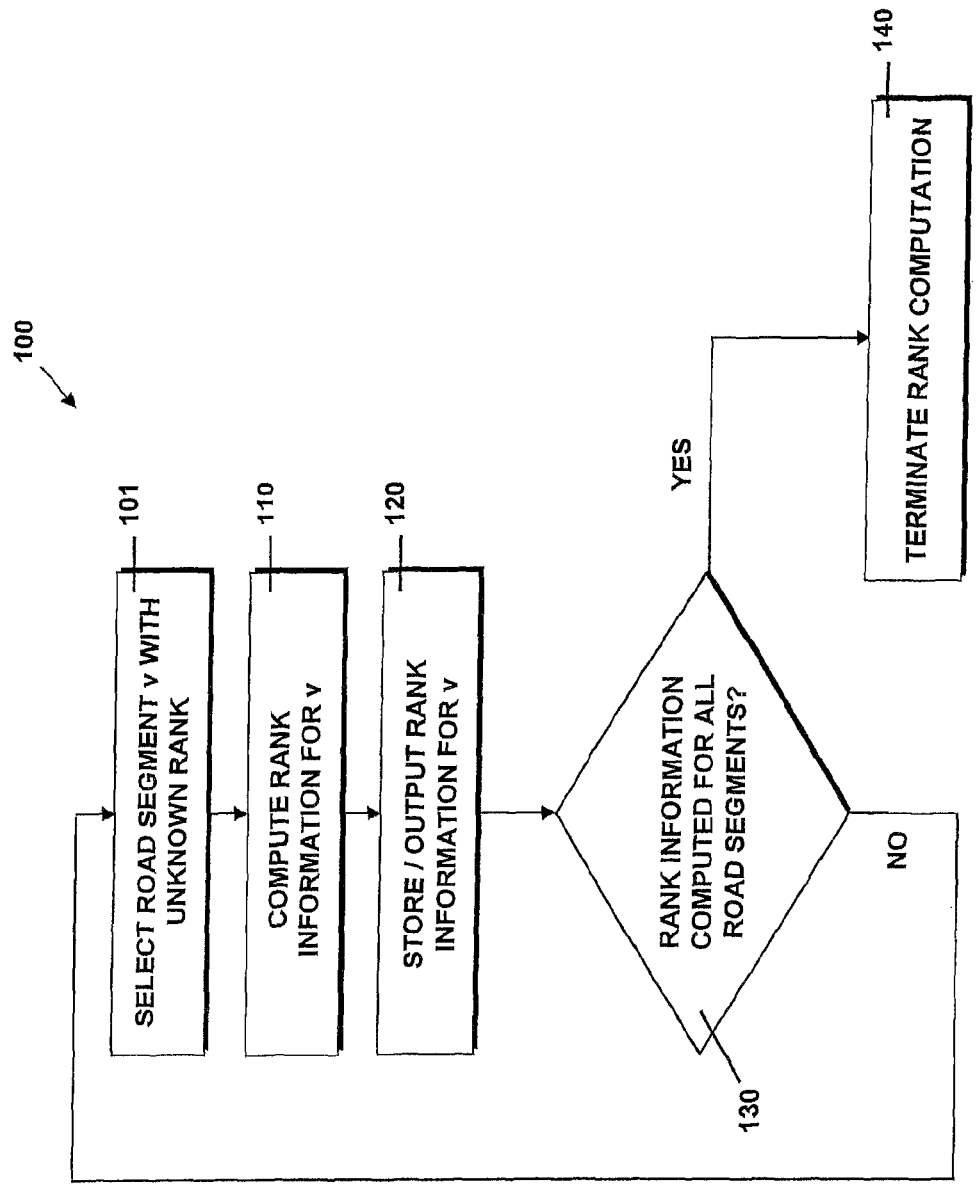
FIG. 5 is a flow chart 100 indicating the basic steps for pre-processing road segment data.
Figure 6:
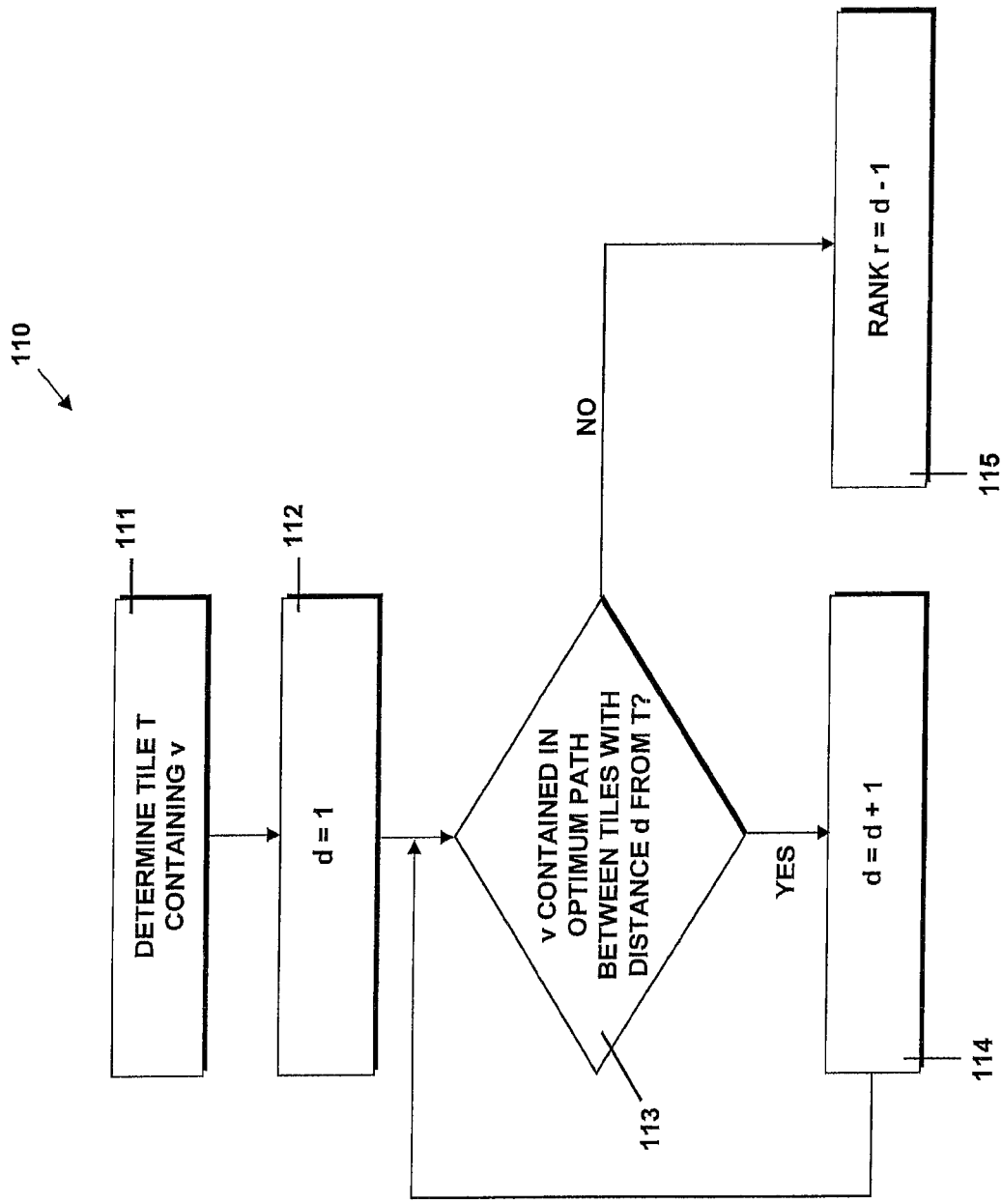
FIG. 6 is a flow chart of the process that may be utilized to perform step 110 of determining rank information.
Figure 7:
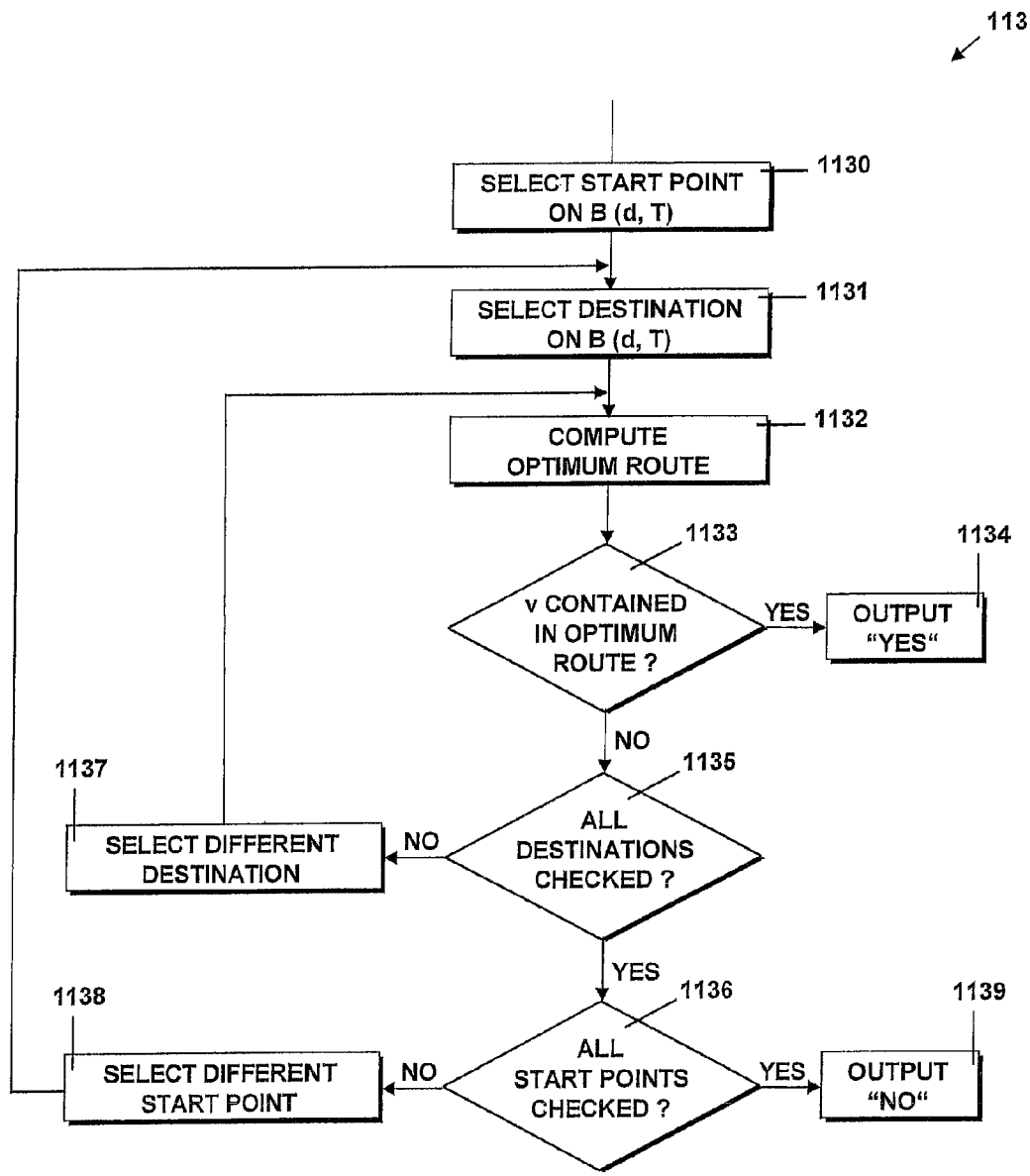
FIG. 7 is a flow chart of one implementation of the branch test 113 in FIG. 6.

With this understanding of rank value for a road segment, the overall process of optimum route determination with tilings may be discussed in more detail by explaining one particular implementation of the teachings of the present disclosure through the block diagram in FIG. 4 and the flow charts in FIGS. 5-7.

FIG. 4 is a block diagram of a system 1 for pre-processing road segment data. The system is adapted to determine, or more specifically, compute the rank information for each one of a set of road segments. The rank information quantifies the relevance of that road segment for long-distance travel. As discussed above, a tiling is provided for an area where the road segment is contained and extending out to adjoining areas so that rank information may be determined to quantify the relevance of the particular road segment for optimum routes connecting different tiles of the tiling.

System 1 may include a first storage unit 10 for storing road segment data, a second storage unit 20 for storing tiling definition data, and a third storage unit 30 for storing the rank information for individual road segments. The first, second, and third storage units (10, 20, and 30) may be different physical devices as shown in FIG. 1 but may also be combined into one physical storage unit such as CD-ROM, CD-R/W, a computer hard drive, or other suitable device.

Road segment data stored in the first storage unit 10 contains information relating to road segments that are part of a road network as discussed above in connection with FIG. 2. The road segment data may include geographic information relating to road segment position and orientation, such as the geographic location of the start and end points for the road segment. The road segment data may include information that in some ways quantifies the length of the road such as the length and a characteristic travel speed or a characteristic travel time for traversing the road segment. The road segment may have additional attributes such as being a one-way road, including a ferry crossing, having different characteristic travel times in one direction versus another direction, or perhaps even different characteristic travel times (or characteristic travel speeds) at one time of day versus another (such as a road that is prone to heavy traffic during a particular portion of a commute).

More generally, a weighting factor may be provided for a road segment based on one or more characteristics of the road segment. While, in the following, the weighting factors will be described as road segment weighting factors, it is understood that one of skill in the art could store the relevant information as properties of a vertex between two road segments or as properties associated with a pair of vertices (defining the start and end point of a road segment) rather than explicitly associating the information with a road segment identified independently of the vertices. For simplicity, all of the possible ways of associating weighting factors with segment of roads or with one or more vertices will be referred to as road segment weighting factors.

Road segment data may also include other information about the road segments beyond the examples listed above. The road segment data may be stored in the form of data arrays (schematically indicated by data sets 11-13 stored in first memory unit 10).

Second memory unit 20 may include tiling definition data for the set of tiles to be utilized in determining rank information data. The data may be in the form of a number of multiplets specifying the coordinates of one or several tile corners. For example, a tiling consisting of rectangular tiles may be represented by providing the coordinates of the top left corner and the bottom right corner for each tile. Other formats may be utilized including specifying each corner of the tile, or for regularly sized tiles, specifying a single corner (or even a center point) for the tile.

Tiling definition data may be stored in the form of arrays 21-23 with each array corresponding to one tile of the tiling. The tiling definition data may be provided in other appropriate ways such as in the form of an algorithm which may be utilized to determine tile vertices and tile edges.

The third memory 30 may be utilized for storing the results of rank information computations. The system 1 for preprocessing road segment data may include a processing unit 40, a working memory unit 50, and additional working memory unit 60, and an output unit 70. The processing unit 40 may be adapted to access data stored in one of the storage units 10, 20, or 30 and put the data into the working memory unit 50. The processing unit 40 may be adapted to remove data from the working memory unit 50 or to process data stored in working memory unit 50. The data stored in working memory unit 50 may include a subset of the road segment data from the first storage unit 10. Rank information for a particular road segment may be output via the output unit 70 or may be stored in the additional working memory 60 for subsequent use. The working memory unit 50 and additional memory unit 60 may be a single device or different devices. An additional working memory unit may be particularly useful if rank information is determined according to a recursive method starting with road segments important only for short-distance travel to road segments also relevant to long-distance travel.

As will become evident from the following description and discussed in some detail below, the implementations of the method for pre-processing road segment data may be adapted for execution on a computer network (not shown) or a computer cluster (not shown). Various implementations for parallel processing are feasible including using peer-to-peer or master-slave schemes (referenced in this disclosure as a master-worker scheme). A master-worker scheme may be implemented such that the master computer and each of a plurality of worker computers have individual processing units and working memory units. The one or more of the computers in a master-worker implementation may share common memory storage units or all computers may be equipped with individual storage units and use them exclusively.

FIG. 5 is a flow chart 100 indicating the basic steps for pre-processing road segment data. In a first step a road segment v, with a yet unknown rank is selected at step 101. In step 110 described in more detail below, the rank information for road segment v is computed. In step 120, the rank information may be outputted via output unit 70 (See FIG. 4) or stored in third storage unit 30 or in the additional memory unit 60. At branch 130 the process is repeated if there are additional road segments with rank information to be determined or the process is terminated at 140 if there are not additional road segments with rank information to be determined.

The step 110 for determining the rank information for a given road segment v is described in more detail in FIGS. 6 and 7. FIG. 6 is a flow chart of the process that may be utilized to perform step 110 of determining rank information. First the tile T that contains road segment v is determined in step 111. In step 112, d (the tile distance as measured relative to tile T) is set to 1. In branch 113, the branch looks at whether road segment v is contained in an optimum path between tiles with distance d from T. Initially, this will determine whether road segment v is in an optimum path between a start point and an end point in tiles with a tile distance of 1 from T. As shown in FIG. 3, a specific question would be whether road segment va is contained in an optimum path between any two vertices on the perimeter of tile T (in this case tile 311). In FIG. 3, there is only one pair of vertices on the perimeter of tile T so the question becomes whether road segment va is on an optimum path between vertices 312 and 313 on the perimeter of tile T (which is tile 311). If there was a second pair of vertices on the perimeter of tile 311 (adding one more vertex would add two new pairs: A) 312 and new vertex; and B) 313 and new vertex), then the question becomes whether road segment va is part of an optimum path between 311/312 or 311/new, or 312/new.

If the answer is yes, that road segment va is part of an optimum route between vertex 312 and vertex 313 on the perimeter of tile 311, then the branch goes to step 114 where d is incremented and the test is repeated.

In this second iteration, the test at branch 113 is whether road segment va is contained in a route between vertices located on the perimeter of the frame of tiles having a tile distance of 1 from tile T (the tile that contains road segment of interest—in this case road segment va). Turning to FIG. 3 for an example, this question is whether road segment va is on an optimum path between vertices 317 and 318 located on the perimeter of a frame of tiles have a tile distance of 1 from tile T (in this case 311). In this case, assume that the optimum path between vertices 317 and 318 is the path through vertices 371-374. Unless there is some other pair of vertices on the perimeter of the set of tiles with tile distance 1 from tile T (in this case tile 311) then the result of branch 113 is NO and the rank for road segment va is set in step 115 as d−1 which in this case would be 2−1 or 1.

FIG. 7 is a flow chart of one implementation of the branch test 113 in FIG. 6. In step 1130, a start point is selected a boundary of tiles a tile distance of d−1 from tile T. Thus for d=1, B(1,T) is the perimeter of tile T. For d=2, B(2,T) is the outer perimeter of the set of tiles with a tile distance of 2−1 or 1. (Alternatively, one could look at it as the inner boundary of the set of tiles with a tile distance of d). For the iteration where d=1, then the start vertex could be vertex 312.

Step 1131 selects a stop point in the same manner. For example, vertex 313 could be chosen as the stop vertex when using tiling 310.

Step 1132 computes an optimum route between the start and stop vertices selected in steps 1130 and 1131. In this case assume that the pair is vertices 312 and 313 in FIG. 3. Step 1132 may be implemented with a standard method such as Dijkstra's algorithm or one of the many A* algorithms. When using an A* algorithm, an estimate for the cost of an optimum route may be obtained from an air distance (as the crow flies) for distance based optimum searches and the air distance divided by a characteristic travel speed for time based optimum searches. If the particular road segment v is part of the computed optimum route, process 113 outputs a yes in termination 1134. Otherwise the process is repeated for all possible start and destination point (stop point or destination) pairs using the nested loops from branches 1135 and 1136 and steps 1137, 1138, and 1131 and 1132. If after checking all combinations of start and stop points for a given level of B(d,T), the particular road segment is not in any optimum route then the output from step 113 is No from termination 1139.

The implementation shown in FIG. 7 selects the start point first in 1130 and then a destination in 1131. The nested loops are set to work with this selection pattern by iterating through the set of possible destinations before altering the set point and then iterating through the set of destinations paired with the new start point. One of ordinary skill in the art will recognize that the order of steps 1131 and 1130 could be reversed and the nested loops adjusted accordingly without any meaningful alteration to the method.

The term optimum may be defined in any number of ways. While many implementations may use either distance or travel time when calculating optimum paths, other factors may be included such as avoiding tunnels or ferries. In some instances, optimum may have other requirements such as a truck wanting directions but only for a route where the route does not have a low overpass such that the truck does not have adequate clearance between the truck and the opening under the overpass.

Thus, the "optimum" route may differ depending on what criteria is being utilized. This may be implemented by having a set of different road segment weighting factors which are utilized by some but not all selection modes.

Combining the flow charts 5, 6 and 7, provides one implementation for computing the rank information for all road segments. In some implementations, it is not necessary to determine the real rank value "r" for each road segment v. A threshold rank value may be utilized and exact rank values determined only if the rank value is less than the threshold value. Careful selection of this threshold rank value may lead to the number of road segments, with a rank value that is better than the threshold rank value, being sufficiently small such that all such road segments may be easily stored in a working memory unit of a system such as a navigation system.

Figure 8:
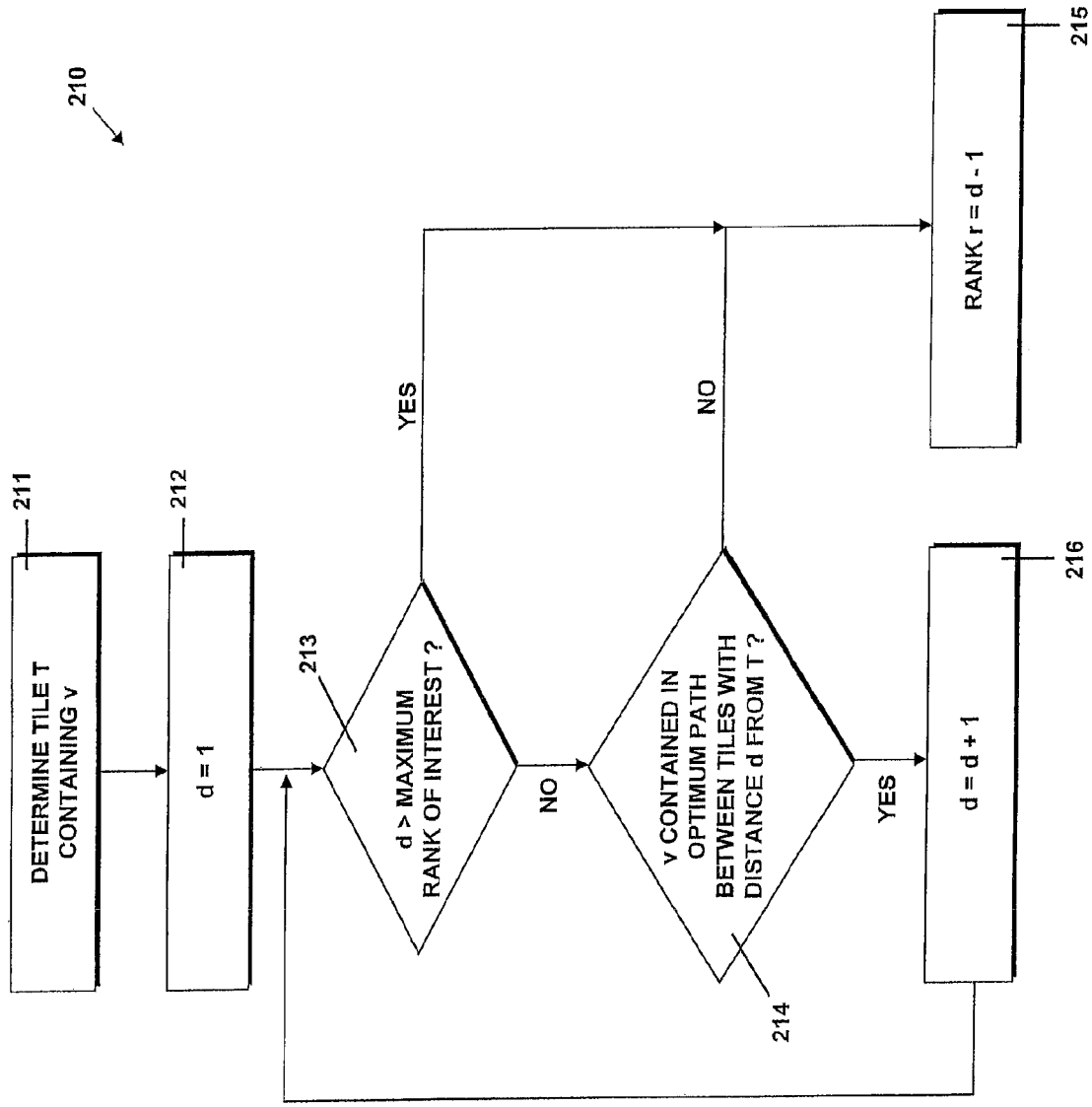
FIG. 8 is a flow chart for process 210 which is an alternative to process 110 in FIG. 6.

FIG. 8 is a flow chart for process 210 which is an alternative to process 110 in FIG. 6. FIG. 8 differs from FIG. 6 in that branch 213 causes the process to end once the road segment v is contained in an optimum path between tiles with a tile distance equal to the maximum rank of interest. For example, if the rank of interest is 5, after it is determined in branch 214 that v is contained in an optimum path between tiles with a tile distance from T (which contains v) of 5, then in step 216, d is incremented from 5 to 6. At branch 213, 6 is more than the rank of interest (which is 5). The process 210 then terminates in step 215 by setting the rank to be 6−1, to cap the rank at the rank of interest of 5.

If the rank of interest is set at a relatively high threshold, then the loss of ability to distinguish between a road segment with a true rank equal to the threshold value and another road segment with a true rank equal to something more than the threshold value is not a significant loss as both road segments are important. The computational savings from putting an upper limit on rank may be significant as certain road segments in an interstate highway may be part of an optimum path between very distant start and destinations.

First Variation.

A slightly different implementation from that described above may present some additional efficiencies. In this variation, the first step finds all road segments with a rank value of at least one. In a subsequent step, all road segments having a rank value of at least two are determined so that the rank information is computed sequentially for increasing rank values. Thus, the step 1132 (FIG. 7) of determining an optimal route after a start point and a destination are selected may be based on results obtained in preceding steps. This use of results obtained in preceding steps may greatly simplify the computation of rank values as will be described in greater detail in connection with FIGS. 9 and 10.

Figure 9:
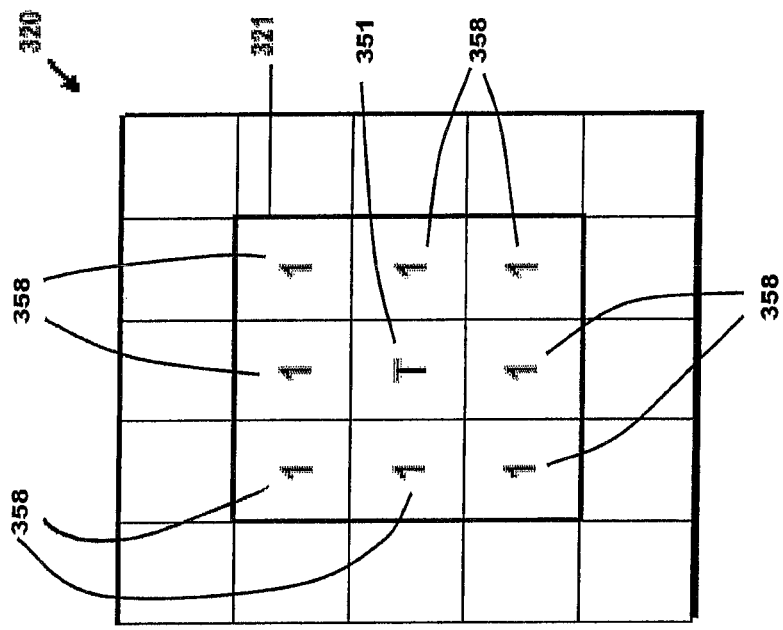
FIG. 9 is a view of tiling 320 with a line indicating the 2-boundary of tile T.

FIG. 9 has tiling 320. Assuming that the road segments in tile T (element 351) having a rank value of at least 2 are to be determined, all optimum routes connecting a start point and a destination on a boundary point on 2-boundary of tile T (351) have to be computed. The thick solid line 321 around the frame of tiles with rank value 1 is the 2-boundary of tile T.

In this implementation for calculating rank value, before the calculations of road segments in tile T with a rank value of at least 2 are performed, the set of road segments having a rank value of at least 1 is determined. Thus, the first step is to determine for all 25 tiles in tiling 320, the set of road segments with a rank value of at least 1.

After determining the set of all road segments with a rank value of at least 1, subsequent work to determine the set of all road segments having a rank value of at least 2 is restricted to all such road segments having a rank value of at least 1. Any optimum path connecting a start point and a destination located on the 2-boundary 321 of tile T (351) traverses a tile having a tile distance equal to 1 from tile T. The optimum route search in step 1132 (FIG. 7) may be restricted to those road segments with a rank value of at least 1 contained in the tiles 358 having a tile distance of 1 from tile T (351) in FIG. 9. By reducing the number of road segments to be considered as part of an optimum route search, the computation task may be reduced and the runtime necessary for the task may be reduced.

Figure 10:
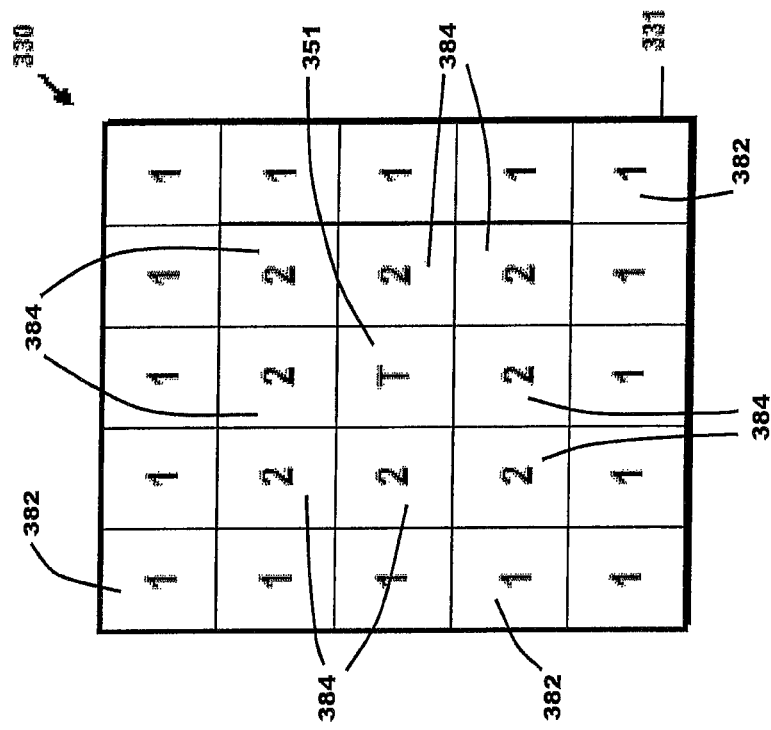
FIG. 10 is a view of tiling 330 with tile T (351) with the tiles marked with the minimum rank values of interest when seeking to identify the road segments in tile T having a rank value of at least 3.

The same argument remains valid for larger values of d. FIG. 10 has tiling 330 with tile T (351). Assuming that the road segments in tile T having a rank value of at least 3 are to be determined, the optimum route search in step 1132 (FIG. 7) may be restricted to road segments that have a rank value of at least 1 for tiles having a tile distance of 2 from tile T (set of tiles 382), and d road segments having a rank value of 2 for tiles 384 having a tile distance equal to 1 from tile T. Note that the sets of road segments having a rank value of at least 1 were calculated before calculating the road segments having a rank value of at least 2. Thus, the computation for finding road segments in T having a rank value of at least 3 is reduced.

More generally, when using a definition of rank value of a road segment as a maximum number of tiles for an optimum path containing this road segment as the middle tile of the set of tiles, the test for a road segment to be relevant in an optimal path between start point in a tile X a tile distance dx from tile Z and a destination in a tile Y a distance dy from tile Z, is that the rank value for a road segment in Z must be at least the minimum of dx or dy. For example, if the tile distance from tile Z to the tile X with the start point is 3 and the tile distance from tile Z to the tile Y with the destination is 4, then a road segment in tile segment Z must have rank value in excess of 3 in order to be a candidate for being on an optimal path between the start point in X and a destination in Y. As the distance between the start point and the destination increases, the minimum distance between a particular tile that may be on the optimum route between the start point and the destination may increase for at least some tiles. The higher rank value criteria for those tiles will reduce the computation required with respect to finding an optimal route through those tiles.

Second Variation.

Figure 11:
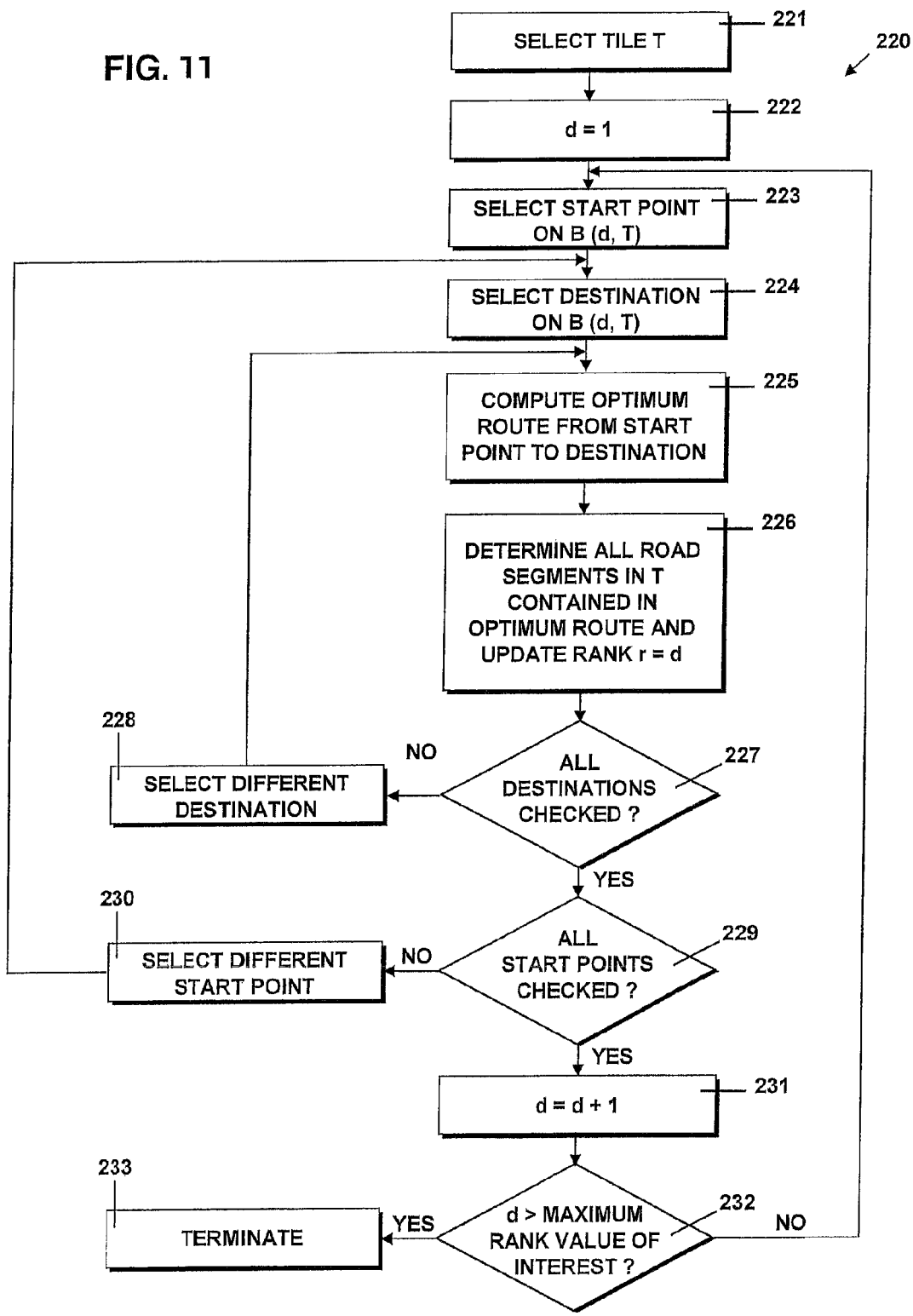
FIG. 11 is a flow chart of a second implementation for computing the rank information.

FIG. 11 is a flow chart of a second alternative implementation for computing the rank information. Runtimes may be further decreased by simultaneously determining all road segments contained in tile T having a rank value of at least d with a reduced number of optimum route computations. This is achieved by modifying the alternative implementation discussed above by computing an optimum route connecting a start point and a destination located on the d-boundary of tile T, and then determining all road segments in tile T contained in this optimum route simultaneously, as indicated by step 226. The rank value for all these road segments is updated to the current value for d. Step 226 is repeated for all possible combinations of start points and destinations, as indicated by steps 227-230. If d is less than the maximum d value of interest, the process is repeated for an incremented value of d. A subset of road segments that qualified as a optimal route at one level of d will remain part of an optimal route when the tile distance is incremented to d+1.

As described in connection with the variation discussed above, the optimum route search in step 225 may be based on a subset of road segments based on results obtained in preceding steps for lower rank values. Thus, the process may not check a road segment to see if it is part of an optimum route for rank value of at least d, unless that road segment was previously found to be an optimum route for a rank value of at least d−1.

Third Variation.

Figure 12:
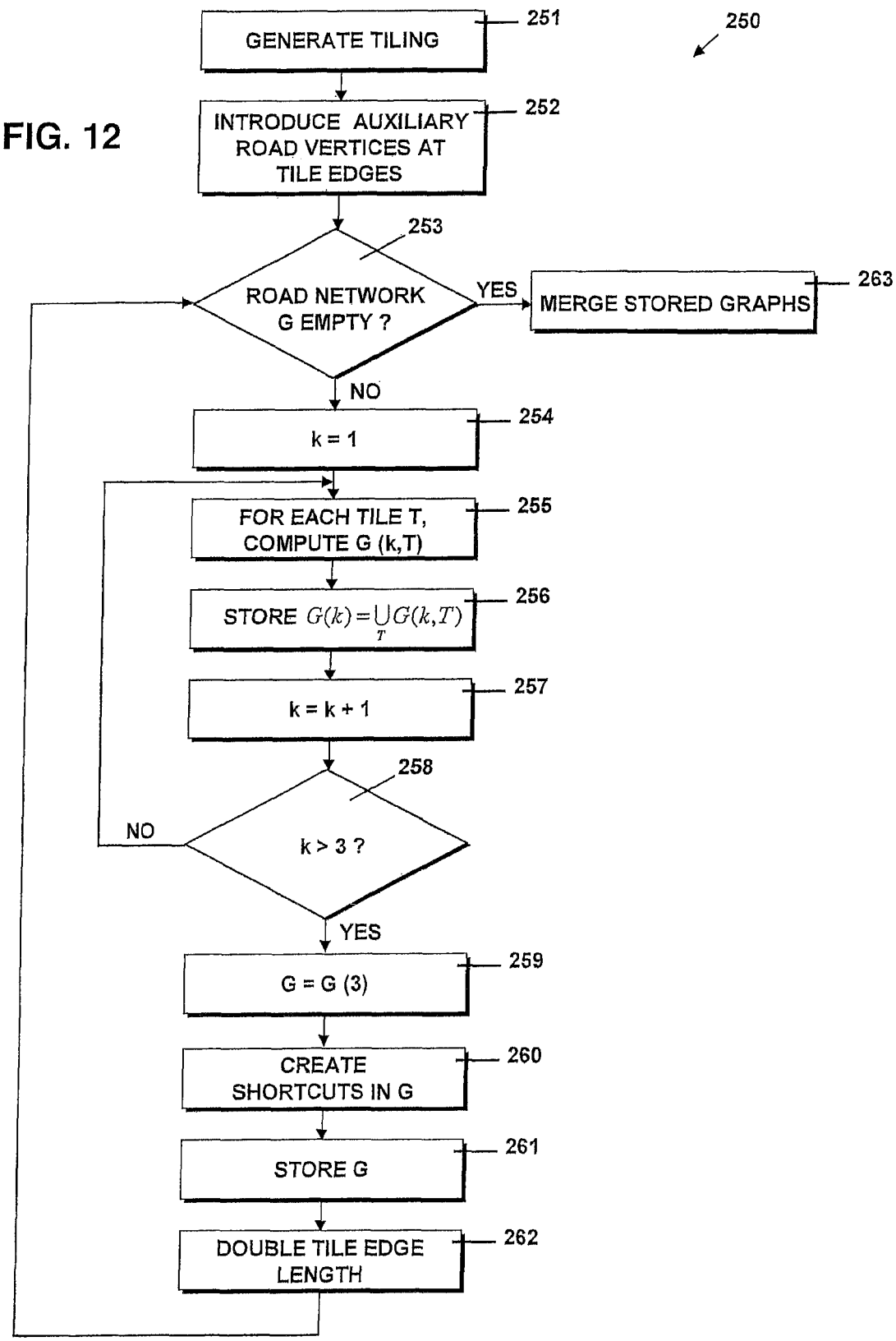
FIG. 12 is a flow chart for a third implementation for computing the rank value where the computation of the rank value may be further streamlined by increasing the tile size.

FIG. 12 is a flow chart for a third variation for computing the rank value where the computation of the rank value may be further streamlined by increasing the tile size. The tile size may be increased while rank value to be determined is increased and thus simultaneously redefining the road network or more specifically the tiling applied to the road network. Method 250 depicted in FIG. 12 has a first tiling defined at step 251. Auxiliary road segment vertices are introduced at the intersections of road segments and tile edges at step 252. While the road network or graph is not empty, the road segments having rank values equal or greater than 1, 2, and 3 are computed in steps 254-258. Step 255 may include steps 223-230 from FIG. 11. An optimum route computation required for these steps may be based on the previously obtained results for a smaller rank value. The road segments of tile T having a rank value of at least k are denoted by G(k,T), and the union of all such road segments of the full tiling is denoted by G(k). Note that G(k,T) is the set of all road segments in T that occur in an optimum route having a start point and destination on the (k−1) boundary of T. At step 259, the road network is redefined as the set of all road segments determined to have a rank value of at least 3 in the preceding loop. The number of road segments is reduced by introducing shortcuts at step 260 as will be explained in more detail below. After increasing the tile edge length at step 262 (such as by doubling or some other multiple greater than 1.0), the above steps are repeated in this next iteration based on the new road network or graph G and the new tiling.

In accordance with this third variation, it is possible to compute the rank information starting from small square tiles with a relatively short initial edge length such as only 1000 meters. Note that the rank information assigned according to this variation is somewhat different from the variations discussed above as the lattice is redefined during intermediate steps. For example, for road segments determined to have a rank value equal to 1 for the redefined tiling with tile edge length $s_2=2*s_1$ and the correspondingly redefined road network, the rank information is set equal to 4.

Note that here the rank information does not directly translate into a rank value for the original tiling. Rather, a rank information of 4 in this variation denotes road segments having a rank value of at least 1 in the redefined road network and for the redefined tiling having a length of twice the original tile edge length. Rank information is assigned correspondingly in subsequent iterations.

For this definition of rank information, while being based on increasingly coarsened tilings, the rank information is a measure of the importance of a road segment for long distance travel or, more specifically, for long-distance routes connecting tiles of the tiling. While the rank or pseudo-rank information computed for the hierarchy of coarsened tilings may not be directly translated back into rank values for the original tiling, they still allow an exact determination of optimum routes based on this rank information, as will be explained below.

The rank values defined in terms of the original road network and original tiling and the rank values defined for the first redefined road network and first coarsened tiling are still interconnected by inclusion relations. The relation may be discerned from the fact that, if A is a tile of the original tiling T and A' is the tile of the first coarsened tiling T' containing A, the set of tiles in T having a tile distance of less than or equal to 4 from A, with the tile distance being measured in terms of T, is contained in the set of tiles in T' having a tile distance of less than or equal to 2 from A', with the tile distance being measured in terms of T'.

Such inclusion relations may also be employed for optimum route determination, as will be explained below. The flow chart of FIG. 12 introduces a hierarchy of coarsened tilings and corresponding rank information.

Other implementations with variations of the process in FIG. 12 are possible. For example, the number of the iterative rank value computations, the number of different k-values in the loop 254-258, may vary depending on tile size. For example, the iteration may use the values from 1 to 3 for the original tile size but from 1 to 4 for all subsequent tile sizes. Further, the iterations over redefined road networks and tile edge lengths need not be continued until the road network or graph G is empty, but may be terminated.

Returning to FIG. 3, road segments va and vd are necessarily contained in an optimum route as all routes shown in FIG. 3 between 312 and 313 contain va and vd and the pair of vertices 312 and 313 are on the 1-boundary of tile 311. It then follows, that va and vd have a rank value of at least 1. Road segments ve, vf, and vg are not contained in any optimum route traversing tile 311 and therefore have a rank value equal to zero. The rank values of road segments vb, vc, and vh depend on whether an optimum route connecting vertices 312 and 313 contains the road segments vb plus vc or the road segment vh. The answer may not be readily apparent from just looking at FIG. 3 as it depends on weighting factors assigned to the respective road segments. For distance-based optimum routes, road segments vb and vc have a rank value equal to 1 while vh would typically have a rank value of zero. For time based optimum route searches, vh has a rank value of 1 if the travel time on road segment vh is shorter than the combined travel time on road segments vb and vc.

Weighting factors and therefore optimum routes may depend on travel direction. If vb and vc are one-way roads traveling in one direction and vh is a one-way road in the direction opposite to vb and vc, then vb, vc, and vh all have rank values of 1 as they are all contained in an optimal route (but not the same optimal route). Note that process 113 contained in the flow chart in FIG. 7 will find the optimum route from start point 312 to destination 313 and will subsequently find the optimum route from start point 313 to destination 312.

Continuing to refer to FIG. 3, after computing the rank information of all road segments contained within a tile by either specifying the exact rank values or a lower bound thereof, if the rank value exceeds a certain threshold, the pre-processing of road segment data may contain a set of combining several road segments which form a sequence and are contained within one tile into a new road segment. This is called creating a shortcut (as referenced in step 260 in FIG. 12). For example, if road segments va, vb, vc, and vd all have rank values of 1 (or at least 1), then the four road segments may be combined to form one new road segment extending from vertex 312 to vertex 313. The weighting factor of the new road segment is computed based on the weighting factors of the four road segments (va, vb, vc, and vd). Such a road segment combination is part of the method for rank information computation explained in connection with FIG. 12. Reducing the number of road segments in this way may reduce the efforts required for optimum route determination such as in a navigation system. The new combined road segment may need to be broken into its components during a subsequent step. Therefore, information about the original road segments may be included as attributes of the new road segment so that the information may be utilized when creating road segments for the components of the shortcut.

The rules for what road segments may be combined to form a shortcut may have additional reliance on rank information such as limiting combinations to road segments having the same rank or road segments with a minimum rank value. For example, the criteria may preclude combining a road segment with a rank value of 1 with a road segment with a rank value of 3 if the criteria calls for combining together road segments with a rank value of at least 2. An implementation may allow a given road segment to be part of more than one shortcut. For example, if vb and ve are part of a one-way road for travel and of is a one way road in the opposite direction, then va and vd may be part of two different shortcuts. The same result would occur of there was an additional vertex just below 313 one the 1-boundary of tile 311 and a road segment exists connecting road segment vh to this new vertex. In this assumed scenario, va would be part of an optimum path to vertex 313 and part of an optimum path to the new vertex and thus may be in two different shortcuts.

The computed rank information may be stored in the third storage unit 30 or in the additional working memory unit 60 of system 1 shown in FIG. 4. In particular, storing rank information in one of the working memory units 50 or 60 of the system 1 is particularly useful for subsequent retrieval of the rank information in a recursive method for computing the rank information as outlined above. The rank information may be stored in a separate storage or memory unit with an identifier allowing one to identify the corresponding road segment, or may be stored as an additional attribute for the corresponding road segment together with road segment data, as indicated by arrays 31, 32, 61, and 62 in FIG. 4.

According to some of the methods for computing the rank information outlined above, in particular the recursive methods, the complexity of the optimum route computation in step 1132 in FIG. 7 or in step 225 in FIG. 11 is reduced by selecting a subset of road segments for which the optimum route search is to be performed. By reducing the total number of road segments to be taken into account, it may be feasible to store all the road segments required for optimum route computation, at least for a given tile T and a given boundary of tile T, in the working memory unit 50. Therefore, the working memory unit 50 of system 1 may be adapted to store all road segment data and, if required, tiling definition data necessary for optimum route computation as performed in steps 1132 or 225, respectively.

As noted above, the methods for computing the rank information may be adapted to be performed on a computer cluster or a grid. This may be desirable in order to reduce the total processing time for rank computation. Since each step of the methods referenced above for computing the rank information for road segments contained in a tile only operates in the neighborhood of this tile, it may be possible to adapt the methods to various schemes adapted for parallel computation of road segment rank information, such as peer-to-peer and master-worker. An illustration of one implementation of a master-worker scheme is provided as part of a comprehensive disclosure without any intent to limit the scope of the claims to this specific implementation.

A network of computers with one designated master and any number of workers may be employed. Conceptually, the master breaks down the problem into small jobs and delegates these small jobs to workers. The master may also collect the results. The master and workers may operate on a common copy of the road network data, with each road segment being marked with the maximum rank computed so far. In practice, it may be easier to have only one copy of the full set of road network data with exclusive access for the master and to let the workers operate on local copies of subsets of road segments created by the master for each job.

In the recursive methods described above, the rank information is computed for increasing rank values, in an outer loop, the master iterates over the rank value k starting with rank value of zero. In other words, this iteration process iterates the size of neighborhoods around a tile to be considered. In an inner loop, the master iterates over all tiles and delegates the computation of the subset of road segments having at least a rank of k+1 and being contained in such a tile (for example tile A). In order to compute these road segments G(k+1, A) for a specific tile A, only a subset of road segments need to be considered. The subset may be selected in accordance to one of the methods set forth above. More specifically, in order to compute G(k+1, A), in a tile B having a tile distance from tile A of less than or equal to k ("$d_{AB} \leq k$"), only road segments contained in G(min(k,k+1−$d_{AB}$), B) need be considered. The notion of G(min($K_1$, K+1−$d_{AB}$, B) repeats the concepts addressed in connection with FIG. 10. Assuming K is currently 5, for an optimum route to run through a road segment in tile A and a road segment in tile B when tile B is a tile distance of 4 from tile A, any relevant road segment in tile B must have a rank value of at least 2 as 2 (K+1−$d_{AB}$)= (5+1−4) as the optimum route must connect to a road segment in tile B that extends the optimal route 2 tiles beyond tile B.

As rank information is computed for increasing rank values, these road segments are already known. The union of these road segments over all tiles B is sufficient for the computation of G(k+1, A). If a worker determines a road segment to be contained in G(k+1, A), the road segment's rank attribute in the common storage is increased to k+1. In the absence of common storage, the worker uses the local copy sent by the master, updates the rank value in the local copy, and sends the updated data back to the master. The master then updates the data stored in the copy of the full data set. After all workers have computed the desired results, the master increments k and starts the next iteration of the outer loop.

The above master-worker scheme may be further optimized. In particular, it may be more efficient to create jobs for larger groups of tiles rather than jobs for a single tile. Therefore, workers may be assigned sets of tiles that are selected such that each one of these data sets is small enough that the union of all road segment data and associated data requiring computing G(k+1, A) for each tile A in this set of tiles may be held simultaneously in the memory of a worker. The worker then loads all this required data and iterates over all tiles in the set of tiles assigned to that worker. In this way, the communication overhead between the master and the workers may be reduced.

Independent of whether a single computer, a computer cluster, or a grid is employed for computing rank information, the computed rank information may be output via output unit 70 (as shown in FIG. 4) for subsequent use in optimum route computation. To speed up the latter, road segment data and the corresponding rank information may be arranged in such a way so as to facilitate and expedite the retrieval of required data. This may be achieved by arranging road segment data for storage and output in a specific way. If the tile size has been varied for rank value determination as discussed above, the road segment data may be arranged first by tile size. The data corresponding to different tiles may be arranged according to a tile's geographic position. For every tile, the data may be arranged according to the rank information. The road segment data may be stored as an array including the rank information as a road segment attribute. If the corresponding road segment is a shortcut formed by combining several original road segments then the road segment data may include information relating to the original road segments. In order to further expedite data retrieval, an index file may be provided containing information on where in the road segment database the data relating to a specific tile size, tile, and rank information may be found.

Because the rank information computed in a pre-processing phase provides a measure of the importance of road segments which may be based on map geometry, the rank information may be retrieved to speed up an optimum route determination performed at a later stage. Such an optimum route determination is frequently performed by a navigation system onboard a vehicle. A navigation system and system for optimum route determination using one implementation of the teachings found in this disclosure is described in reference with FIGS. 13-15.

Figure 13:
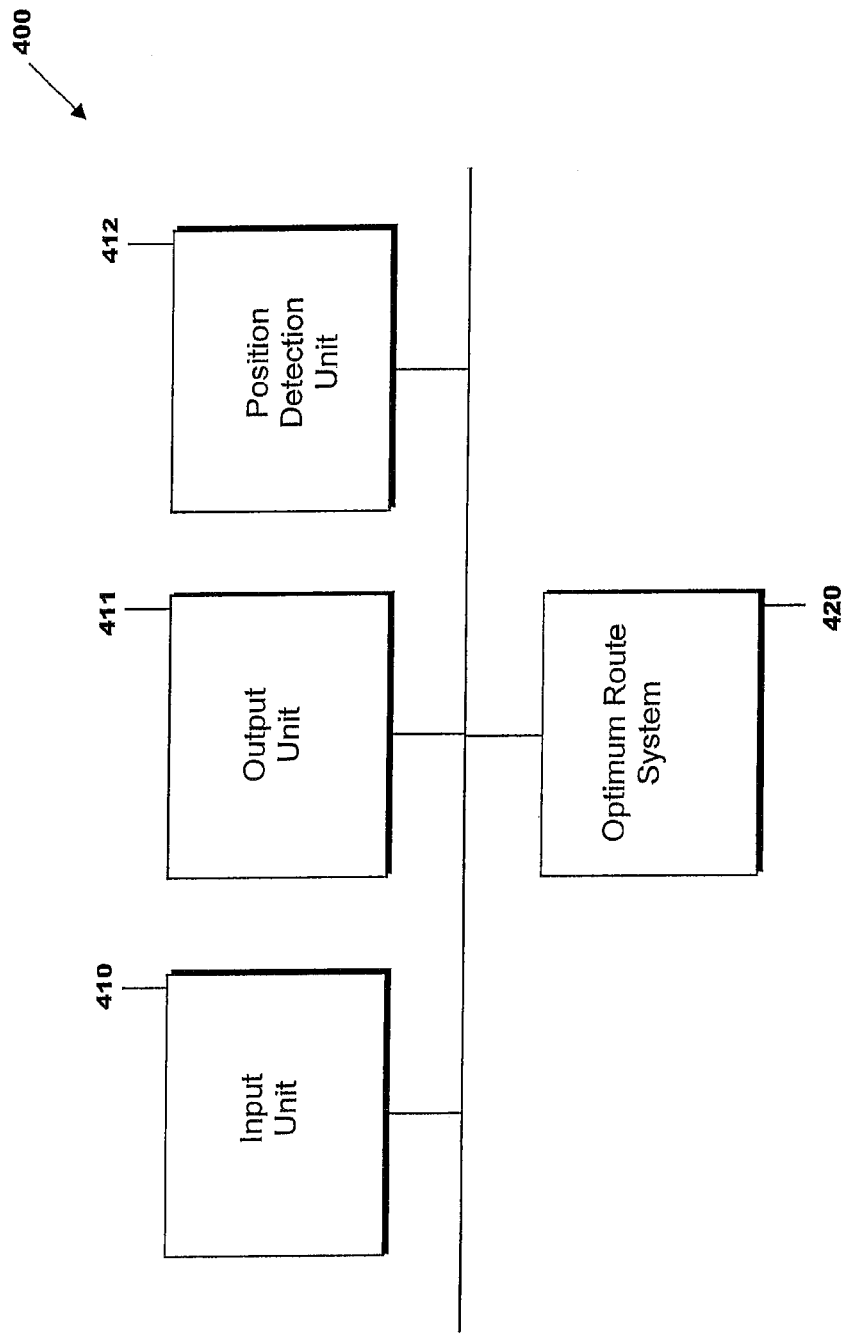
FIG. 13 is a block diagram of navigation system 400.

The navigation system 400 shown in FIG. 13 includes an input unit 410, an output unit 411, position detection unit 412, and a system 420 for determining, or more specifically, computing an optimum route. Each of the components 410-412 may be one of the corresponding components from conventional navigation systems. For example, the input unit 410 may include a touch-screen, the output unit 411 may include a display or a set of one or more loudspeakers coupled to a text-to-speech conversion unit, and the position detection unit 412 may include a GPS receiver or a gyroscope. (GPS is a well-known acronym for any of the Global Positioning Systems.) A position detection unit 412 may be used to allow a driver that does not know the current position of the driver's vehicle to use an onboard navigation system 400 to find an optimum route to a desired destination.

Figure 14:
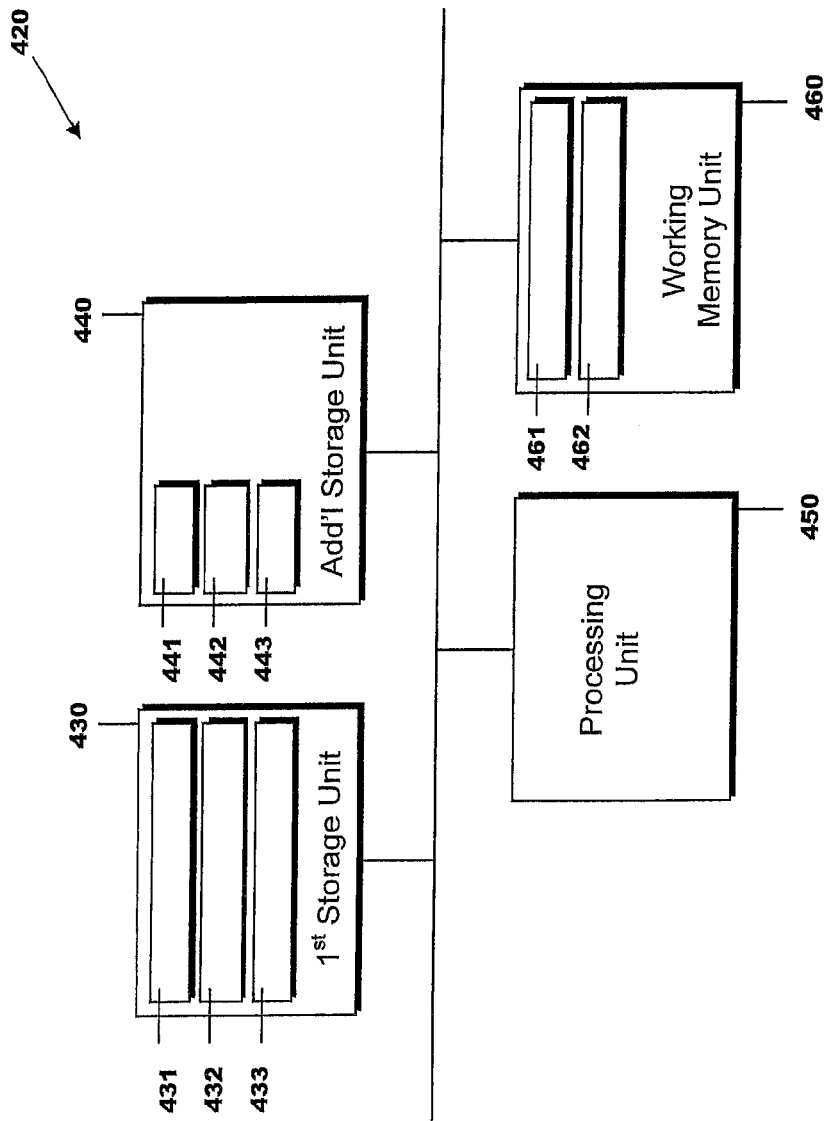
FIG. 14 is a block diagram of a system for computing an optimum route 420.

One implementation of a system 420 for computing an optimum route is shown in FIG. 14. System 420 may include a first storage unit 430 that in accordance with one implementation is adapted to store both road segment data and associated rank information computed during the pre-processing phase described above. The data may be stored as arrays 431-433, the rank information being included into these arrays as additional road segment attributes. Alternatively, the rank information may also be provided via a separate storage unit. System 420 may include an additional storage unit 440 for storing tiling definition data. This data may be stored in the form of a number of multiplets 441-443. System 420 may include a processing unit 450 and a working memory unit 460 adapted to store subsets of road segment data. Again this may be in the form of arrays 461 and 462 that may contain information on the road segment position and orientation, associated weighting factors, and rank information, or possibly either associated weighting factors or rank information rather than both. The tiling definition data and road segment data may be substantially identical to the data sets employed for road segment data pre-processing, with the possible exception that the road segment data includes rank information and the sets utilized for pre-processing may not.

After receiving information on a route start point and a destination, the system 420 for optimum route determination may initiate a optimum route search and compute an optimum route. Providing the rank information and a tiling for the area containing the road segments may allow the optimum route computation to be carried out efficiently, as will be described next with reference to FIGS. 15 and 16. Assuming that the start point is contained in the start tile S and the destination is contained in destination tile D, and assuming that the start and destination tiles have a tile distance greater than 1, any optimum route connecting the start point and the destination will traverse at least one tile having a tile distance of at least 1 from the start tile and from the destination tile. Therefore, it is sufficient to consider only road segments having a rank value of at least 1 in all such tiles. Similarly, by definition of the rank value as described above, in a tile having a tile distance of at least 2 from both the start and destination tiles, only road segments having a rank value of at least 2 are potentially contained in an optimum route from the start point to the destination. Therefore, it may be sufficient to restrict an optimum route search to these road segments in the corresponding tiles.

This concept is shown conceptually in FIG. 15 for a tiling 510 with start tile S and destination tile D arranged in opposite corners of the tiling. Tiles 511 and 515 each have a tile distance equal or greater than 1 from both the start and the destination tile. Therefore, only the subset of road segments having a rank value of at least 1 need to be considered, as is indicated schematically but the symbol G(1) which designates that subset of road segments in that tile having a rank value of at least 1. Naturally, G(1) is different for tiles 511 and 515, as the complete tile index for each tile is not included here for the sake of brevity. Likewise, in tiles 512 and 516, only road segments having a rank value of at least 2 (G(2)) need to be taken into account. For tiles 513 and 517, only road segments having a rank value of at least 3 (G(3)) need to be taken into account. For tile 514, only road segments having a rank value of at least 4 (G(4)) need to be taken into account as any road segment in tile 514 that is part of an optimum route between a road segment in S and a road segment in D must be part of an optimum path of at least rank value 4 as both $d_{514,S}$ and $d_{514,D}$ are 4. Therefore, an optimum route computation is performed taking into account the rank information and, more specifically, by computing an optimum route for a subset of road segments, the subset being selected based on the rank information and tiling data.

If the computation of the rank information is terminated at a maximum rank value of interest, the subset of road segments on which optimum route search is performed may include additional road segments, as indicated in FIG. 16. If, for the tiling 520, the maximum rank value of interest is equal to 3 meaning that the rank information has been set to 3 for all road segments having a rank of 3 or more, the subset of road segments on which an optimum route search is to be performed will also include road segments having a rank value equal to 3 in tiles 524 and 525. By definition, a road with a true rank value of 3 in tile 524 cannot be part of an optimum path from tile S to tile D, as tile 524 has a tile distance of 4 from both tile S and tile D. However, since road segments in tile 524 with true rank values of 4 or more are stored with max rank value of 3, all road segments with rank value 3 must be tested. By adding road segments to the subset, the computational complexity increases, but the method performed by the system for optimum route determination 420 still provides exact results.

Figure 17:
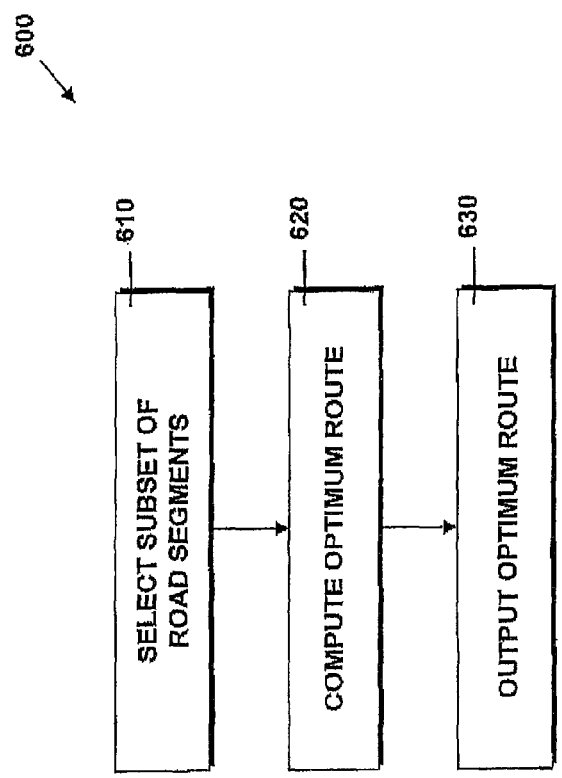
FIG. 17 is a flow chart 600 for one process for a system for computing an optimum route.

Referring to FIG. 17, a flow chart 600 for one process for a system for computing an optimum route 420 (FIG. 13) may include the steps of selecting a subset of road segments based on the rank information and tiling data as indicated in step 610; computing an optimum route based on the subset of road segments in step 620; and outputting the optimum route at step 630 such as outputting to the output unit 411 (FIG. 13) of the navigation system 400 (FIG. 13).

Figure 18:
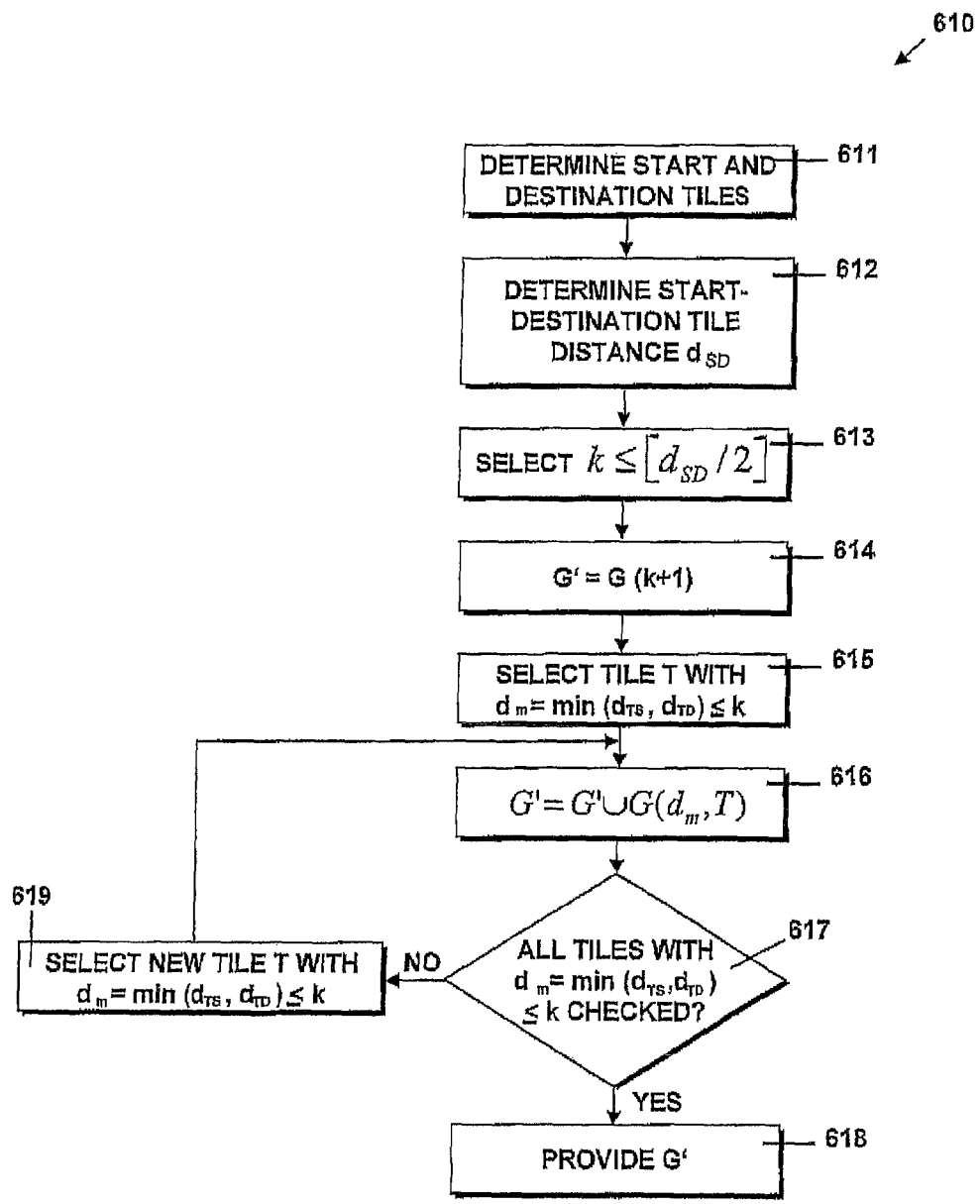
FIG. 18 is a flow chart representation of one implementation of a process 610 for selecting a subset of road segments.

A flow chart representation of one implementation of a process 610 for selecting a subset of road segments is shown in FIG. 18. First, in step 611, the start tile containing the start point and the destination tile containing the destination are determined. In step 612, the start-destination tile distance $d_{SD}$ between these tiles is computed. Subsequently, in step 613, an integer k less than or equal to the floor of ($d_{SD}$) divided by 2 is selected. If the rank information computation in the pre-processing phase has been terminated at a maximum value of interest, k will typically be chosen as to not exceed this maximum rank value of interest minus 1.

In step 614, the subset G' of road segments on which the optimum route search is to be performed is initialized as the set of all road segments contained in all tiles of the tiling and having a rank value of at least k+1, denoted by G(k+1). After initializing the subset G', in steps 615-619, additional road segments are included into G'. For each tile T having a tile distance less than or equal to k from either the start tile S or the destination tile D, the distances being denoted as $d_{TS}$ and $d_{TD}$, respectively, the set of all road segments contained in T and having a rank value equal to or larger than the smaller one of the tile distances $d_{TS}$ and $d_{TD}$ is included into G'. The set of road segments contained in T and having a rank value equal to or larger than the smaller of the tile distances $d_{TS}$ and $d_{TD}$ is denoted by G($d_m$, T). This step is iterated for all tiles having a distance less than or equal to k from either the start tile S or the destination tile D. In particular, in this implementation, all road segments contained in the start or destination tiles are included in G'. After the iteration terminates, G' is provided for further processing in step 618.

As described above, including in the third variation for computing the rank value provided in the flow chart in FIG. 12, the rank information may be computed for a hierarchy of coarsened tilings. In this case, the rank information or pseudo-rank value computed for a coarsened tiling does not directly translate into a rank value for the original tiling. However, by employing the same hierarchy of coarsened tilings during optimum route computation as during road segment pre-processing, an exact optimum route may still be computed efficiently. Therefore, if road segment data pre-processing has been based on a hierarchy of tilings, tiling definition data is provided for each one of these tilings for optimum route computation, for example in the form of a mathematical function describing each one of the tilings.

For a hierarchy of tilings, with rank values being computed for the various levels of the hierarchy, the step of selecting a subset of road segments 610 may be modified as compared to the process described above. At each level of the coarsening hierarchy, the process may be substantially similar to the one discussed in connection with FIG. 18. Consider the case that, during data pre-processing, after completion of all road segments having a rank valued of at least r, the road network may be redefined for the first time while the tiling is simultaneously coarsened from the original tiling T to tiling T'. Then, the road segments having a rank value of at least zero, of at least 1, et cetera up to at least r are known in the terms of the original tiling T. Then, the subset of road segments in step 610 may be selected in the following way. First, for all road segments having a distance of less than r from the tile S containing the start point and tile D containing the destination, road segments are include in G' similarly to steps 615, 616, 617, and 619 of FIG. 18 described above.

Subsequently, the sets of tiles in T' covering the sets of tiles in the original tiling T having a tile distance of less than r from tile S and having a tile distance of less than r from tile D, denoted as S' and D' respectively, and referred to as "hulls" of the corresponding set of original tiles are determined. Note that in this implementation, the tile distance of less than r is still measured in terms of the original tiling T. Subsequently, for each of the original tiles contained in S' and having a tile distance of at least r from tile S, and for each of the original tiles contained in D' and having a tile distance of at least r from tile D, the road segments in these tiles having a rank value of at least r−1 are included into the subset G' of road segments.

Outside of S' and D', road segments may be included into G' based on rank based on rank information computed for the first coarsened tiling. More specifically, for any tile A' of the coarsened tiling having a distance of at least k from both S' and D', it may be sufficient to include the set of road segments contained in A' and having a rank value of at least k, but now as determined with respect to coarsened tiling, into G', similar to steps 615, 616, 617, and 619 of FIG. 18. If the rank value computation for the coarsened tiling has been terminated for values less than k, the road segments contained in A' and having the maximum rank value still be determined are included into G'.

For a hierarchy of tilings comprising several increasingly coarsened tilings, the above method of determining hulls of specific tile neighborhoods and, outside of these hulls, including road segments into the subset of road segments G' on the basis of the coarsened tiling and corresponding rank values may be repeated.

In the system for optimum route determination 420, the selection of a subset of road segments may be achieved by the processing unit 450 which includes road segment data into the data stored in the working memory 460 based on the rank information and tiling definition, according to the criteria outlined above. The working memory 460 may provide sufficient storage capacity such that the road segment data corresponding to subset G' may be stored simultaneously and an optimum route search may be performed on this data.

Returning to FIG. 17, the step of computing an optimum route 620 for the subset of road elements may be performed using a standard optimum path algorithm, such as Dijkstra's algorithm or an A* algorithm. In the latter case, for distance-based optimum routes, an air distance between two points provides a lower limit for the real optimal path cost. For time-based optimal routes, an air distance divided by a characteristic travel speed provides a lower limit for optimal path cost.

The optimum route is output at step 630. The optimum route may be output to a user interface such as the navigation system output unit 411. Because the system 420 for computing an optimum route may interface with other components of the navigation device in essentially the same way as a conventional system for optimum route determination, it may be readily combined with various features known from navigation systems in the art.

Additional Variations.

While the above-described method for computing an optimum route provides an exact solution for the optimum route problem, several variations are conceivable which provide at least approximate optimum routes. For example, in order to decrease computational complexity and, therefore, runtime or memory space requirements, the total number of road segments contained in the subset G' could be decreased by setting more stringent conditions for a road segment to be included into the subset G' using the tile distance and the rank values. Also, it is conceivable to use the rank information as a measure of road segment relevance independent of the tiling definition during optimum route determination. For example, road segments may be included into the subset G' if their rank value plus 1 is not less than the smallest distance of one of the road segment vertices from the start point and destination, respectively, divided by a characteristic tile edge length employed during road segment data pre-processing.

It is to be understood that, although the above method for optimum route computation has been illustrated for one tile size only, if the tile size has been varied during road segment pre-processing, it may be varied correspondingly during optimum route determination. In particular, with increasing distance from the start point or destination, only road segments having higher rank information values need to be taken into consideration. With this rank information being computed based on an increasingly coarsened tiling, the tiling is coarsened correspondingly during optimum route computation.

While the discussion above centered on finding the one optimum route under one definition of optimum, multiple rank information data values may be provided for one road segment. The different rank information values may correspond to shortest route, fastest route, routes without tunnel, routes without ferries, or routes selected in accordance with some other criteria. With these different rank information values accessible, the optimum route computation may be performed based on a user defined mode selection for any one of the supported modes, with the subset of road segments being selected based on the rank information corresponding to the respective mode or combination of modes (such as shortest route without a ferry). If the rank information has been computed for various different cost functions, the rank information corresponding to each one of these different costs functions may be stored for each road segment. Alternatively, for each road segment, only the maximum of the rank values obtained for the different cost functions may be stored, thus reducing the required storage capacity. However, the optimum route computation yields an exact optimum route even in the latter case.

While the tiles discussed above have been square, other polygonal shapes including rectangles may be used with compensation or acceptance of any asymmetry. Polygons such as triangles, pentagons, hexagons, octagons, and other more complex octagons may be used to form tilings.

The step of defining a tiling may include providing edge or vertex data for each tile. Alternatively, the tiling process may be specified by providing tile size, tile shape, and just a first tile position. The flexibility in how tiling is defined affords the designer an opportunity to make efficient use of runtime or storage resources.

While tile distance between two tiles may be defined as the minimum number of tile edges or tile vertices traversed on a path between two tiles, such that tile distance is an integer number which may be convenient for use in subsequent calculations, this is not the only way that tile distance may be defined. Tile distance may be defined as a distance metric between tile centers or tile corners, or another useful metric.

While the method for data preprocessing has been described in terms of a road network with road segments, the method is not limited to processing of road segments. Rather, the method according to any one aspect or embodiment described above may be carried out on an arbitrary graph containing a plurality of edges. The graph may be interpreted bases on a tiling applied to the graph so that it may be processed as a road network with a tiling as described in this disclosure. The graph may be directed or undirected. The subject matter of the graph is not limited by this disclosure. The range of examples for graphs that may benefit from the disclosed methods include power lines of an electrical network or data lines of a communication or data network. Complicated networks with many segments representing any type of underlying situation may benefit from the computational reductions available from overlaying a tiling grid and using the methods set forth in this disclosure.

Although the term "optimum route" is used throughout, the methods and systems may be used to determine advantageous routes which are not optimum in a mathematical sense but, may be near-optimum routes or simply good choices for routes. A system may be designed to provide good choices rather than optimum choices as the difference in results between a good choice and an optimal choice for the typical solution may not merit the additional computational resources needed in order to provide an optimum route consistently within a desired runtime duration. All such variants are also contemplated by the present invention.

One of skill in the art will recognize that alternative implementations set forth above are not universally mutually exclusive and that in some cases additional implementations may be created that implement two or more of the variations described above. In a like manner, one of skill in the art will recognize that certain aspects of the present invention can be implemented without implementing all of the teachings illustrated in any of the various disclosed implementations. Such partial implementations of the teachings of the present invention fall within the claimed subject matter unless the claims are explicit in calling for the presence of additional elements from other teachings.

In order to promote clarity in the description, common terminology for components is used. The use of a specific term for a component suitable for carrying out some purpose within the disclosed invention should be construed as including all technical equivalents which operate to achieve the same purpose, whether or not the internal operation of the named component and the alternative-component use the same principles. The use of such specificity to provide clarity should not be misconstrued as limiting the scope of the disclosure to the named component unless the limitation is made explicit in the description or the claims that follow.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

The invention claimed is:

1. A system for optimum route determination, comprising:
a first storage unit containing road segment data;
a second storage unit containing rank information data;
a working memory unit for storing a subset of the road segment data; and
a processing unit coupled to the working memory unit and adapted to determine an optimum route from a start point to a destination based on the rank information data, the rank information data for a road segment respectively being independent of a destination of the optimum route determination and indicating whether the road segment is contained in an optimum route having a start point located in a first tile of a tiling, the first tile having at least a distance defined by the rank information data.

2. The system for optimum route determination of claim 1 where the system includes an additional processing unit adapted to manage the data stored in the working memory unit based on the rank information data.

3. The system for optimum route determination of claim 1, where the system includes a third storage unit containing tiling definition data.

4. The system for optimum route determination claim 1 where the working memory unit has a storage capacity sufficient to store a subset of the road segment data required for optimum route determination.

5. A system for optimum route determination, comprising:
a first storage unit containing road segment data;
a second storage unit containing rank information data;
a working memory unit for storing a subset of the road segment data; and
a processing unit coupled to the working memory unit and adapted to determine an optimum route from a start point to a destination based on the rank information data, the rank information data for a road segment stored in the second storage unit respectively being independent of a destination of the optimum route determination and indicating whether the road segment is contained in an optimum route having a start point located in a first tile of a tiling, the first tile being different from a tile of the tiling in which the road segment is located and the first tile having at least a distance defined by the rank information data from the tile of the tiling in which the road segment is located.

6. The system of claim 5 where the subset of the road segment data stored by the working memory unit is selected as a function of the rank information value.

7. The system of claim 5 where the rank information value for a road segment respectively indicates whether the road segment is contained in an optimum route having a start point located in a first tile and a destination point located in a second tile, the first tile being different from the tile in which the road segment is located and the second tile being different from the tile in which the road segment is located.

8. A navigation system for use in providing guidance on a suitable route for a vehicle comprising:
   an output unit;
   a position detection unit;
   a system for computing an optimum route from a start point to a destination through a use of a tiling applied to a network of road segments, the system for computing an optimum route utilizing a rank information value for a road segment, which rank information value is stored in a storage unit and is independent of a destination of the optimum route determination and indicates whether the road segment is contained in an optimum route having a start point located in a first tile of a tiling, the first tile being different from a tile of the tiling in which the road segment is located, and the first tile having at least a distance defined by the rank information value.

9. The navigation system of claim 8 where the position detection unit is adapted to provide a set of data sufficient to define a current position of the navigation system to be used as the start point.

10. The navigation system of claim 8 where the rank information value for a road segment respectively indicates whether the road segment is contained in an optimum route having a start point located in a first tile and a destination point located in a second tile, the first tile being different from the tile in which the road segment is located and the second tile being different from the tile in which the road segment is located.

* * * * *